United States Patent
Lodeweyckx

(10) Patent No.: US 9,591,476 B2
(45) Date of Patent: Mar. 7, 2017

(54) MOBILE USING RECONFIGURABLE USER IDENTIFICATION MODULE

(71) Applicants: SONY CORPORATION, Minato-ku (JP); SONY EUROPE LIMITED, Surrey (GB)

(72) Inventor: Stefan Lodeweyckx, Herent (BE)

(73) Assignees: SONY CORPORATION, Tokyo (JP); SONY EUROPE LIMITED, Surrey (GB)

( * ) Notice: Subject to any disclaimer, the term of this patent is extended or adjusted under 35 U.S.C. 154(b) by 8 days.

(21) Appl. No.: 14/378,820

(22) PCT Filed: Feb. 18, 2013

(86) PCT No.: PCT/GB2013/050384
§ 371 (c)(1),
(2) Date: Aug. 14, 2014

(87) PCT Pub. No.: WO2013/124635
PCT Pub. Date: Aug. 29, 2013

(65) Prior Publication Data
US 2015/0038116 A1    Feb. 5, 2015

(30) Foreign Application Priority Data
Feb. 24, 2012    (EP) .................................... 12156941

(51) Int. Cl.
*H04W 8/22*    (2009.01)
*H04W 8/18*    (2009.01)
(Continued)

(52) U.S. Cl.
CPC ........... *H04W 8/22* (2013.01); *H04L 63/0853* (2013.01); *H04W 8/18* (2013.01); *H04W 12/06* (2013.01)

(58) Field of Classification Search
None
See application file for complete search history.

(56) References Cited

U.S. PATENT DOCUMENTS 6,011,976 A * 1/2000 Michaels ............. G06Q 20/341
455/420
6,065,054 A    5/2000 Dutcher et al.
(Continued)

FOREIGN PATENT DOCUMENTS

EP    1 422 964    5/2004
WO    2011/036484    3/2011

OTHER PUBLICATIONS

International Search Report Issued May 31, 2013, in PCT/GB13/050384 filed Feb. 18, 2013.
(Continued)

*Primary Examiner* — Hilina K Demeter
(74) *Attorney, Agent, or Firm* — Oblon, McClelland, Maier & Neustadt, L.L.P.

(57) ABSTRACT

A mobile data communications device includes: a reconfigurable user identification module operable to store at least a current primary mobile identity, the mobile device being operable to provide mobile data communication via a mobile network subject to the primary mobile identity being authorized with the mobile network; and a detector to detect the user identity of a current user of the mobile device; the mobile device being operable to access a mobile identity database which provides a mobile identity to the reconfigurable user identification module for use as the primary mobile identity, in response to the detected user identity of the current user of the mobile device.

12 Claims, 13 Drawing Sheets

(51) Int. Cl.
*H04W 12/06* (2009.01)
*H04L 29/06* (2006.01)

(56) References Cited

U.S. PATENT DOCUMENTS

| | | | |
|---|---|---|---|
| 6,978,156 B1 | 12/2005 | Papadopoulos et al. | |
| 8,965,366 B1* | 2/2015 | Somayajula | H04W 60/00 370/328 |
| 9,020,479 B1* | 4/2015 | Somayajula | H04W 48/18 455/418 |
| 2004/0103289 A1 | 5/2004 | Akama | |
| 2004/0180657 A1* | 9/2004 | Yaqub | H04L 63/0853 455/435.1 |
| 2010/0203864 A1* | 8/2010 | Howard | H04W 12/04 455/411 |
| 2012/0282924 A1 | 11/2012 | Tagg et al. | |
| 2012/0322505 A1* | 12/2012 | Lodeweyckx | H04W 12/06 455/558 |
| 2013/0023235 A1* | 1/2013 | Fan | H04W 48/18 455/411 |
| 2013/0143560 A1* | 6/2013 | Nenner | H04W 8/183 455/435.1 |

OTHER PUBLICATIONS

"Smart Cards; Secured packet structure for UICC based applications(Release 9)", ETSI TS 102 225 V9.0.0, pp. 1-22, (2010).
"Use cases and requirements related to Embedded UICCs", ETSI TS SCP #48, SCP ( 11)0146r1, 2 pages, ( 2011).
"3$^{rd}$ Generation Partnership Project; Technical Specification Group Services and System Aspects; 3G Security; Security Principles and Objectives", (3G TS 33. 120 Version 3.0 .0),(1999), pp. 1-10.
"Deep packet inspection", http://en.wikipedia.org/wiki/Deep_packet_ispection, as downloaded on Feb. 18, 2013, 10 Pages.
International Preliminary Report on Patentability and Written Opinion issued Sep. 4, 2014 in PCT/GB2013/050384.

\* cited by examiner

Example: 206 01 1234567890

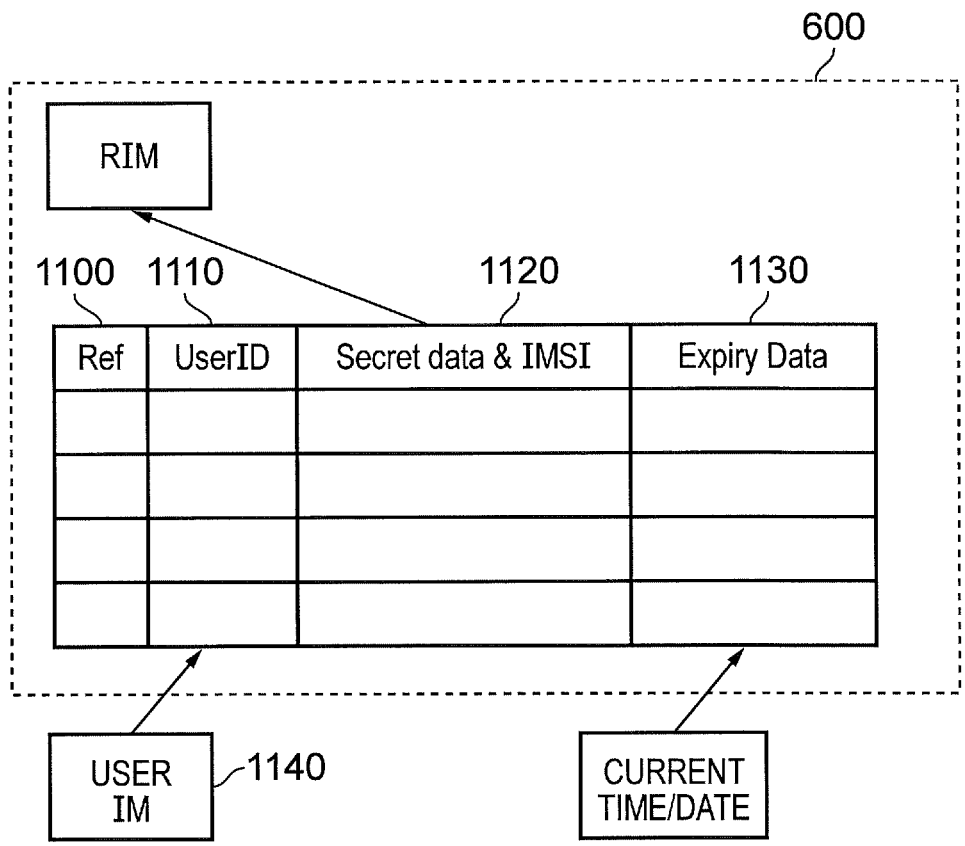
FIG. 15
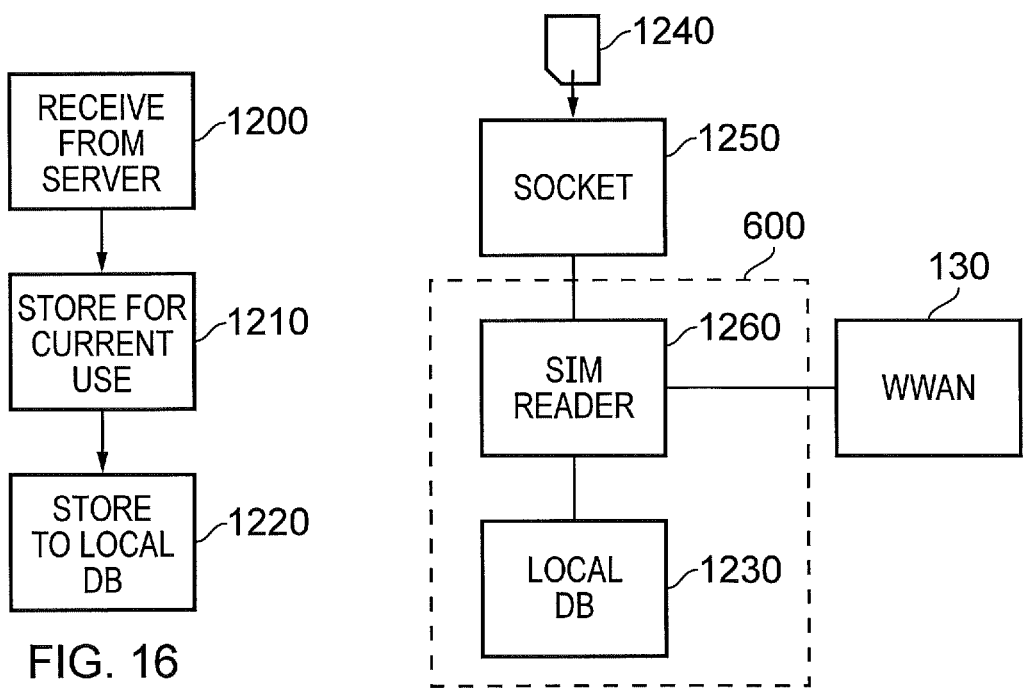
FIG. 16
FIG. 17

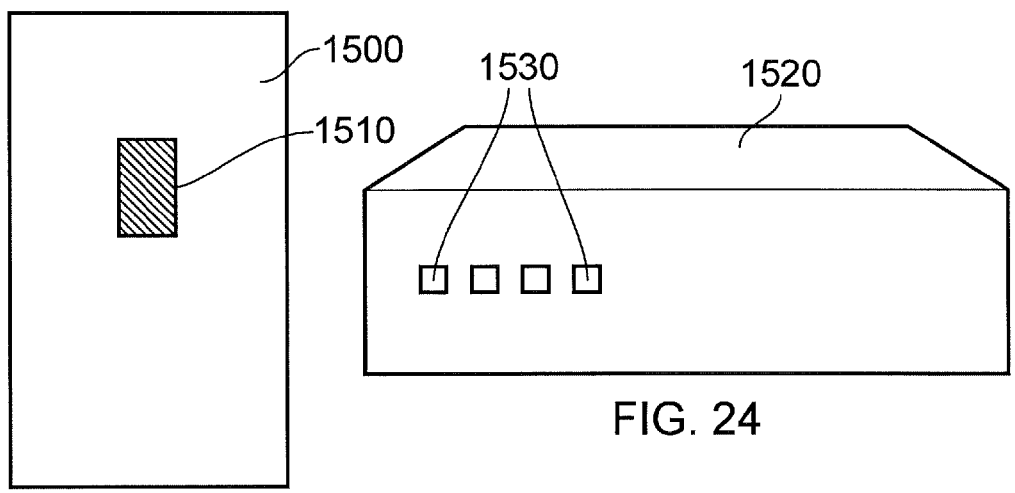

MOBILE USING RECONFIGURABLE USER IDENTIFICATION MODULE

CROSS REFERENCE TO RELATED APPLICATION

The present application claims the benefit of the earlier filing date of EP12156941.2 filed in the European Patent Office on 24 Feb. 2012, the entire content of which application is incorporated herein by reference.

FIELD

This disclosure relates to mobile communications.

DESCRIPTION OF THE RELATED ART

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art.

Mobile data communication devices, including so-called smart phones, tablet computers and other portable data handling devices (referred to here generically as user equipment or "UE"), are often arranged (for example) to access the Internet via a wireless data connection provided by a mobile data network. Such a mobile data network typically comprises an array of base stations geographically separated from one another, with the UE communicating with a nearby base station by a wireless signal. An example system currently in use is the so-called 3G LTE system.

Connection via a mobile data network can provide a great deal of flexibility to the user of the UE, in that data access can be possible from a wide variety of geographical locations. A disadvantage is that the costs of such data access are typically relatively high, and are generally significantly higher than the cost of accessing the Internet using a wireless (Wi-Fi) or wired connection to a broadband Internet service such as a domestic broadband service. Therefore, it is typical for users to prefer their UEs to implement a data connection by a local area network if one is available, and only to use a mobile data network if no local network is available.

A SIM (subscriber identification module) is typically a secure data storage device embodied as a small form factor flat card which is insertable into a mobile communications device. The SIM carries certain data which uniquely identifies the user or owner of that SIM. Some of this data is transmitted across the mobile network to identify the user equipment (UE) into which the SIM is inserted, and some is kept secret within the SIM (and within a secure database held by the mobile network operator) for use in generating encryption keys for secure data transmission across the network. The SIM is associated with a user, or at least with a payment account. Because of the expense of mobile data access associated with the SIM (rather than WiFi access which tends to be independent of the SIM), there is an incentive for the owner of a mobile data device not to allow other people to access the internet using that device and its mobile data connection.

In many countries there is a requirement that the SIM fits into a socket in the UE which is accessible by the user. This is to allow the user to choose a different card if he/she desires. The ability for the user to do this is required by the competition law of many countries. In principle, this would allow a user other than the device owner to substitute his own SIM for temporary use of a mobile data device.

However, there are two particular drawbacks in such an arrangement. One is that the SIM, being linked to a payment account, is both very small and in many cases rather valuable to its owner. The small size means that a SIM outside of a mobile device is easy to lose. The value arises because of the risk of monetary loss to the owner, and potentially a loss of data privacy, if the SIM is stolen or lost and then used by someone else. Another problem is that although replacing a SIM with another one is possible, it is not necessarily easy. It may involve the use of special tools or the removal of the covers and battery of the device. So it is not something to be undertaken casually.

Having said this, some devices such as the Amazon® Kindle® electronic book reading device contain a SIM which is inaccessible to the user. This type of SIM will be referred to as an "embedded" SIM, though of course in the case of embedded SIMs, the word "card" often associated with "SIM" does not necessarily have any sensible meaning and does not imply any particular shape or form factor for the circuitry providing the SIM functionality. In other words, the user cannot choose a different network operator for mobile data access using this particular book reading device, but this is allowable under competition law because this particular device does not allow open internet access over the mobile network.

The European Telecommunications Standards Institute (ETSI) has recognised the future potential of including the functionality of a SIM (or, more generally, of a "UICC" or universal integrated circuit card) into a wide variety of devices. In general terms, this will provide communication functions to types of devices which have operated independently (that is, not using a mobile network) in the past. The way in which this would be carried out would be to embed the UICC in such a way that the UICC is not generally accessible or replaceable by the user.

ETSI has established a working group to look into the issues generated by the use of embedded UICC devices. This work is carried out by the ETSI TC Smart Card Platform group #48, and a document specifying a work item to address standardisation requirements has been accepted as SCP(11)0146r1, which is incorporated herein by reference and is available at: http://portal.etsi.org/portal/server.pt/community/scp/333

This ETSI document recognises the need for the user to be able to change network subscriptions on devices with embedded UICCs allowing wireless wide area network (WWAN) connectivity, which in turn has prompted the proposal to develop new methods for securely and remotely provisioning access credentials on embedded UICC devices to replace those currently in use on the device. The scope of work defined by the document covers "defining use cases and corresponding requirements for remote personalisation and subscription management of . . . an embedded UICC including its integration in telecommunication network infrastructures".

A previously proposed arrangement is disclosed in U.S. Pat. No. 6,065,054 the entire content of which application is incorporated herein by reference.

SUMMARY

This disclosure provides a mobile data communications device comprising:

a reconfigurable user identification module operable to store at least a current primary mobile identity, the mobile device being operable so as to provide mobile data communication via a mobile network subject to the primary mobile identity being authorised with the mobile network; and a detector to detect the user identity of a current user of the mobile device;

the mobile device being operable to access a mobile identity database which provides a mobile identity to the reconfigurable user identification module for use as the primary mobile identity, in response to the detected user identity of the current user of the mobile device.

According to embodiments, a mobile device is configured to access a database of mobile identities so as to establish a connection to a mobile data network using a mobile identity appropriate to the user identity of a current user associated with the device.

This allows multiple users to make use of a single device using their own mobile identities, without the need to physically swap SIM cards between uses.

Further respective aspects and features of the disclosure are defined in the appended claims.

It is to be understood that both the foregoing general description and the following detailed description are exemplary, but not restrictive.

BRIEF DESCRIPTION OF THE DRAWINGS

A more complete appreciation of the disclosure and many of the attendant advantages thereof will be readily obtained as the same becomes better understood by reference to the following detailed description of embodiments, when considered in connection with the accompanying drawings, wherein:

FIG. 15 schematically illustrates a user database;

FIG. 16 schematically illustrates a process for populating a locally held database;

FIG. 17 schematically illustrates parts of a UE which are operable to populate a locally held database;

FIG. 23 schematically illustrates a circuit board having an embedded SIM; and

FIG. 24 schematically illustrates a UE including the circuit board of FIG. 22.

Referring now to FIG. 1, an example of a mobile communications network comprises a user equipment (UE) 10, a base transceiver station (BTS) 20 (the equivalent function being referred to as "NodeB" in the context of a UMTS (Universal Mobile Telecommunications System) 3G (third generation) network, but only the acronym BTS will be used in this description), a base station controller/radio network controller (BSC/RNC) 30, a mobile switching centre (MSC) 40, a serving GPRS (general packet radio service) support node (SGSN) 50, a Gateway GPRS Support Node (GGSN) 55, a home location register (HLR) 60 and an authentication centre (AUC) 70. The MSC 40 connects to a public switched telephone network (PSTN) 80. The SGSN 50 connects to the Internet 90 via the GGSN 55.

Figure 1:
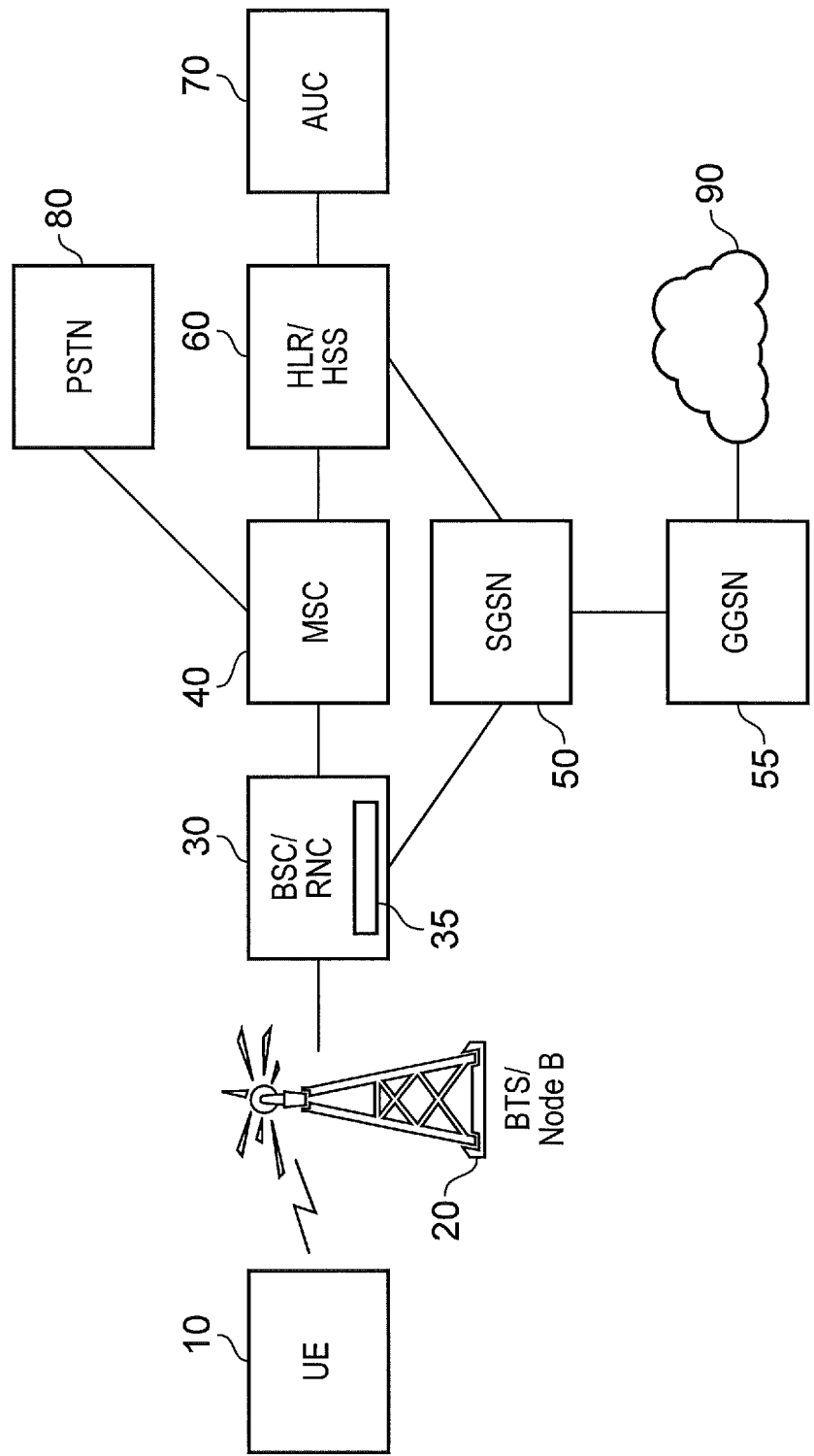
FIG. 1 is a schematic diagram of a mobile communications network.

The UE includes a SIM (to be referred to here for reasons to be described below as a "RIM"). In general terms, a "UICC" (Universal Integrated Circuit Card) is a term used to describe the physical format of a card such as one embodying a SIM, whereas the term "SIM" is used here to describe the functionality of mobile identification carried out by such a device.

In operation, the UE 10 connects via a wireless link to the BTS 20 which in turn is connected (usually by a wired or other point to point link) to the BSC/RNC 30. The BTS contains equipment for transmitting and receiving radio signals, antennas, and equipment for encrypting and decrypting communications with the BSC/RNC 30.

The BSC/RNC 30 controls the operation of the BTSs 20. Typically a BSC/RNC has many BTSs under its control. The BSC/RNC allocates radio channels and controls the handover of communication with a particular UE between different BTSs. The BSC/RNC 30 also multiplexes the many different low data rate communications with individual UEs into a higher data rate connection with the MSC 40.

The BSC/RNC 30 may have an associated packet control unit (PCU) 35 which carries out some of the functions of the BSC/RNC 30, but for packet data. The BSC/RNC, BTSs and PCU are sometimes collectively referred to as the BSS (base station subsystem) or, in 3G networks, the RAN (radio access network).

The MSC 40 is primarily responsible for routing voice calls, SMS (short messaging service, otherwise known as "text") messages and circuit switched data. In respect of voice calls, the MSC 40 is able to route a call from a mobile UE to a fixed (landline) telephone using the PSTN 80. In general terms, the MSC is responsible for setting up and releasing the end-to-end connection, supervising hand-over between BSC/RNCs during a call and coordinating charging and account monitoring.

The HLR 60 (the generally equivalent function within 3G networks, as of LTE or "Long Term Evolution", being known as the Home Subscriber Server or HSS) is a central database that contains details of each mobile phone subscriber that is authorised to use the core network. There can be several HLR/HSSs in existence, though each individual mobile subscriber identity can be associated only with one logical HLR/HSS (although this can span several physical nodes) at a time.

The HLR/HSSs store details of every SIM issued by a mobile phone operator. Each SIM has a unique identifier called an IMSI which is the primary key to each HLR/HSS record. The HLR/HSS also stores MSISDNs (Mobile Subscriber Integrated Services Digital Network Numbers) which represent the telephone numbers associated with the SIMs. A SIM has a primary MSISDN which is the number used for making and receiving voice calls and SMS messages, but it is possible for a SIM to have other secondary MSISDNs, for example being associated with fax or circuit switched data calls. An IMSI is also associated with details of services applicable to that user and call divert settings associated with an MSISDN. Note that in general, a SIM need not necessarily have an associated MSISDN, if the SIM is used in the context of data access only.

The HLR/HSS 60 also connects to the AUC 70 whose function is to authenticate each SIM that attempts to connect to the network. This authentication process will be described in detail below. In brief, however, when the authentication process takes place (typically when a UE is first switched on), the UE sends its IMSI to the AUC via the HLR/HSS. The AUC replies with data derived from a so-called triplet of authentication data derived using a secure key known only to the AUC and to the SIM. This secure key is referred to as Ki. The SIM then sends a further reply to the AUC based on data from the triplet and, assuming the reply is in the correct form, the SIM (that is to say, that IMSI) is authorised for interaction with the network. The secure key Ki is securely stored on the SIM (which in the case of current SIMs takes place during manufacture), and is also securely replicated onto the AUC. These are the only copies of the secure key Ki. In conventional systems Ki is never transmitted between the AUC and the SIM, but instead is combined with the IMSI to produce a challenge and response for identification purposes and an encryption key called Kc for use in over-the-air communications.

The IMSI-Ki pair represents data defining a mobile identity, comprising an identification value (IMSI) which is transmitted to the mobile network as part of the network authorisation procedure, and a secure key (Ki) which is conventionally not transmitted to the mobile network as part of the network authorisation procedure, but from which the SIM derives identification data and encryption/decryption key data for use in encryption and decryption of data communication over the mobile network.

Once authentication has taken place, the authorisation triplet data is buffered at the SGSN 50. The triplet includes the encryption key Kc for use in encrypting data transfers between the UE and the network. The encryption/decryption process using Kc takes place at the currently active BSS/RAN applicable to that UE.

The Gateway GPRS Support Node (GGSN) is a main component of the GPRS network and handles matters such as IP (internet Protocol) address assignment and the like. The GGSN controls interaction between the GPRS network and external packetised networks such as the Internet 90. The GGSN checks if a user (being a recipient of a data transfer) is active, and if so, forwards the data to the respective SGSN serving that user. If the mobile user is inactive, the data is discarded. When a user initiates a data transfer, the packetised data is routed to the correct external network by the GGSN.

Figure 2:
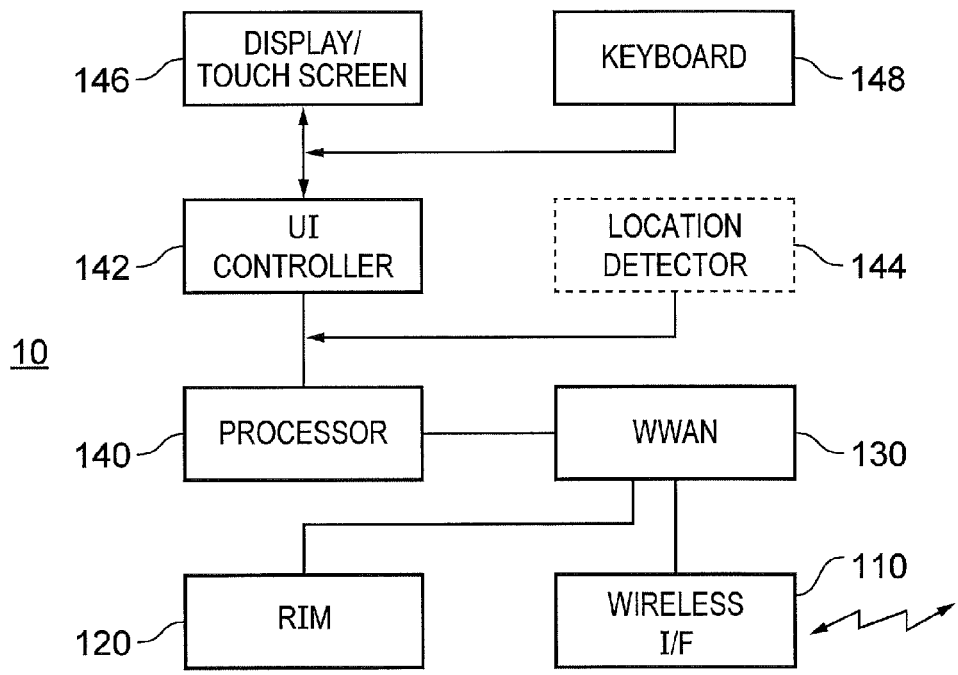
FIG. 2 is a schematic diagram of a user equipment (UE)

FIG. 2 is a schematic diagram of an example UE making use of data communications via the mobile network. The UE comprises a wireless interface 110 which provides the wireless communication with the BTS 20, a Reconfigurable SIM ("RIM") 120, a wireless wide area network (WWAN) processor 130, a data processor 140, a user interface (UI) controller 142, an optional location detector 144 such as a Global Positioning System (GPS) location detector, and user interface components. The user interface components are shown schematically in FIG. 2 as a display and touch screen 146 and a keyboard 148, but the skilled person will appreciate that various types of UI components such as buttons, lights, touch panels and the like, may be used instead of or in addition to these items.

The RIM acts as an identification module for securely providing a mobile identity to a mobile data network for use in identifying mobile equipment in which that identification module is installed. It can be non-removable by the user (for example, being permanently soldered or welded into the UE and/or not being accessible from the outside of the UE without dismantling), removable by the user (for example, fitting into a standard SIM card socket accessible from the outside of the UE) or implemented in software as described below. Note that the term "reconfigurable" is used in the sense that the mobile identity as held by the RIM can be changed or configured at least once, though that one change might be from the state of not having a stored mobile identity to the state of having a stored mobile identity. In other embodiments, the mobile identity can be changed on multiple successive occasions.

In the present case, the RIM acts as a reconfigurable user identification module operable to store at least a current primary mobile identity, the mobile device being operable so as to provide mobile data communication via a mobile network subject to the primary mobile identity being authorised with the mobile network.

Once the RIM of the UE 10 has been authorised, the operation involves the data processor 140, under the control of appropriate application software and/or firmware, initiating a message to be sent via the mobile network and passing that message to the WWAN processor 130 which formats it into a suitable form for transmission (for example as so-called IP data packets). Using a key Kc supplied by the RIM and an "A5" encryption algorithm (see below), the WWAN processor 130 encrypts the data packets. The encryption key Kc used for encryption is the one that was established during the authorisation process. The encrypted data is then passed from the WWAN processor 130 to the wireless interface 110 for transmission to the BTS 20. With regard to messages received from the network, data is transmitted from the BTS 20 to the UE and is received by the wireless interface 110. The data is decrypted by the WWAN processor using a key Kc supplied by the RIM 120, and is formatted (for example, depacketised) to be passed to the application software running on the data processor 140.

Figure 3:
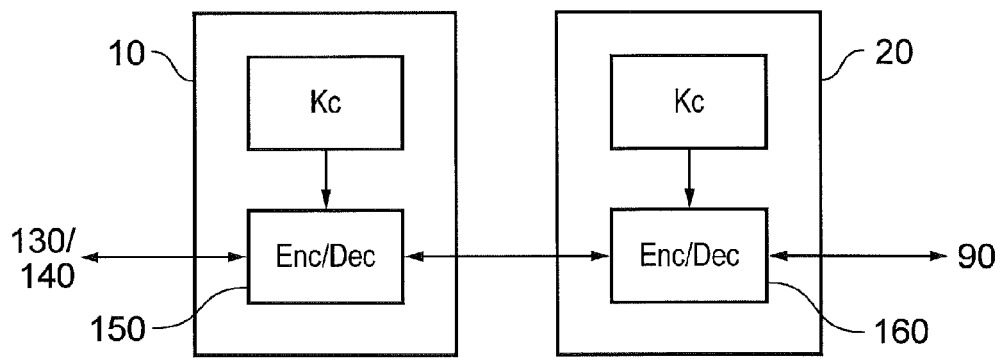
FIG. 3 is a schematic diagram of a data communication process via the network of FIG. 1.

FIG. 3 is a schematic diagram of a data communication process via the network of FIG. 1. Here, the encryption and decryption processes are illustrated in a schematic form. At the UE 10, data passing to and from the data processor 140 (via the WWAN processor 130) is subject to an encryption/decryption process 150 under the control of the key Kc. The encrypted data is passed via the mobile network to the BTS 20 where it is decrypted using an encryption/decryption process 160, again with reference to the key Kc. The clear (no longer encrypted) data is then transferred to and from the Internet 90. Accordingly, the data path between the RIM 120 and the BTS 20 carries data which is encrypted using the key Kc, whether that data is being transmitted to the UE or from the UE. Data outside of that encrypted path is clear data.

Figure 4:
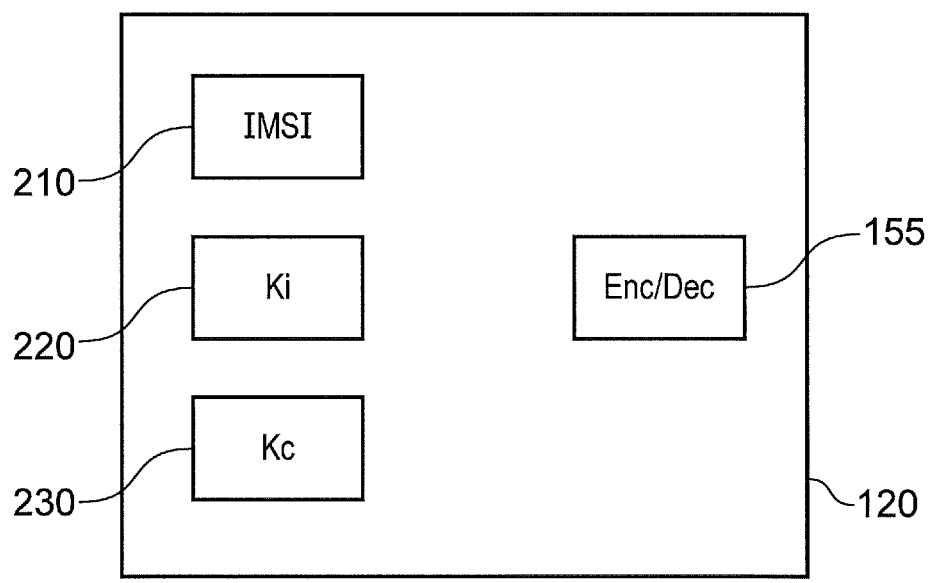
FIG. 4 schematically illustrates a SIM.

FIG. 4 schematically illustrates an example of a RIM. The term "RIM" stands for "reconfigurable (subscriber) identification module", and this identification function is carried out by virtue of the RIM carrying a unique IMSI and associated respective unique secure key Ki associated with a subscriber. The significant features of the RIM shown in FIG. 4 are as follows: secure storage 210 (or at least a mobile identity storage controller for accessing memory, which would normally be on the RIM, which securely stores data defining the IMSI) for the IMSI, secure storage 220 (or at least a storage controller as above) holding the secure key Ki, memory storage 230 which holds the encryption key Kc and other temporary data and an encryption/decryption function 155 which also acts as a network interface for generating data derived from a mobile identity for transmission to a mobile network during a network authorisation procedure, and for handling acknowledgement data received back from the mobile network indicating whether authorisation was successful based on that mobile identity. The encryption/decryption function 155 carries out various different functions at different stages in operation. At least three encryption algorithms are provided. In brief, the two of these directly relating to the RIM are referred to as the A3 algorithm and the A8 algorithm. The A5 algorithm is used by the WWAN processor 130 and will be described for comparison.

The A3 algorithm is a one-way function used to compute a signed response (SRES) during the authentication process. The generation and use of the SRES will be described further below. The A3 algorithm resides on the RIM and at the AUC.

The A5 algorithm is a two-way function used by the WWAN processor 130 to encrypt and decrypt data that is being transmitted over the wireless interface, that is to say, it is the function which encrypts and decrypts data using the encryption/decryption key Kc described with reference to FIG. 3.

The A8 algorithm is a one way function used to generate the 64-bit key Kc. The generation of the key Kc will be described further below. The A8 algorithm also resides on the RIM and at the AUC.

Figure 5:
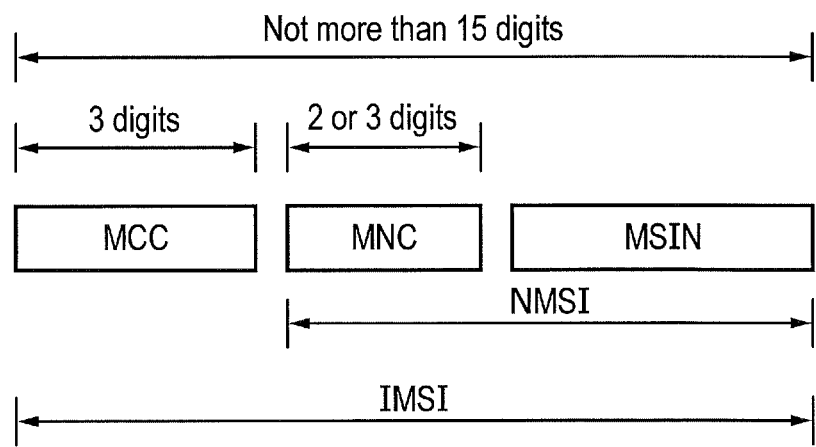
FIG. 5 schematically illustrates the structure of an IMSI (International Mobile Subscriber Identifier)

Note that in 3G networks, an enhanced authentication algorithm (AKA—Authentication and Key Agreement) is used, and algorithms other than the A5 algorithm may be used. Other techniques, such as using a 128 bit CK (Ciphering Key) rather than the 64 bit Kc, may apply. Differences between 3G and 2G (second generation) networks are widely published, for example in http://www.3gpp.org/ftp/tsg_sa/wg3_security/_specs/33120-300.pdf, the entire content of which is incorporated herein by reference FIG. 5 schematically illustrates the format of an IMSI. The term "IMSI" stands for "international mobile subscriber identifier" and represents a respective unique identification associated with each user of the network. It is stored as a 64-bit field in secure storage 210 within the RIM and, when required, is sent by the UE to the network.

The maximum length of an IMSI is 15 decimal digits. The first three digits represent a mobile country code or MCC which identifies the country of origin of the subscriber's RIM. The next two or three digits represent a mobile network code or MNC which identifies a network company which provided (or possibly, which owns) the RIM. The final digits provide a mobile subscriber identification number or MSIN which is unique to a particular RIM within that network and that country defined by the MNC and MCC. The MNC and MSIN together provide a national mobile subscriber identification or NMSI.

Figure 6:
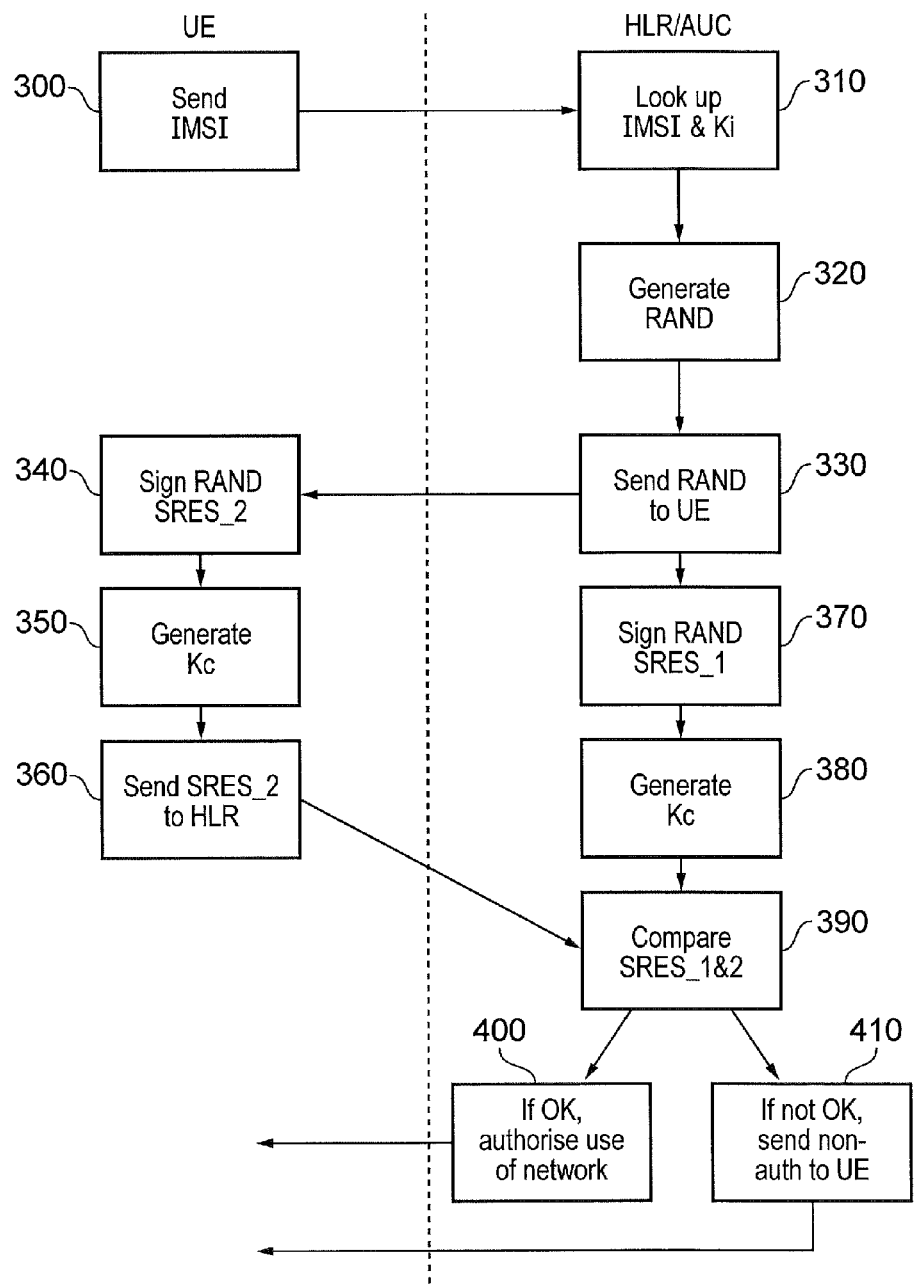
FIG. 6 is a schematic flowchart illustrating an authorisation process between a UE and the network.

FIG. 6 is a schematic flowchart illustrating an example of an authorisation process between a UE and the network. Steps shown to the left of the vertical broken line are carried out at the UE 10 and steps shown to the right of the vertical line are carried out at the HLR/HSS 60 and/or the AUC 70.

At a step 300, the UE sends its IMSI to the network. In response to receipt of the IMSI, the HLR/HSS consults the AUC to request that the AUC generates an authorisation triplet. The AUC 70 consults its database to find the secure key Ki corresponding to that IMSI at a step 310. At a step 320, the AUC generates a single-use random number, RAND. At a step 330, the AUC sends the random number RAND to the UE. The UE receives the random number RAND and, at a step 340, signs the number RAND with the RIM's secure key Ki to generate a signed response SRES_2.

The RIM then generates the encryption/decryption key Kc by applying the A8 algorithm to the number RAND and the secure key Ki, at a step 350. As mentioned above, the encryption/decryption key Kc is used later (subject to a successful authorisation) for encrypting and decrypting communications via the mobile network during the present session. At a step 360, the UE sends the signed response SRES_2 back to the network.

Meanwhile, the AUC also generates a signed response SRES_1, by applying its stored version of the secure key Ki relating to that IMSI to the number RAND, at a step 370. As a step 380, the AUC generates the encryption/decryption key Kc by applying the A8 algorithm to the number RAND and the secure key Ki.

As a step 390, the AUC compares the signed responses SRES_1 and SRES_2. If the IMSI and Ki pair held by the RIM of the UE matches the IMSI and Ki pair held by the AUC, and bearing in mind that the versions of the A3 algorithm used by the RIM and the AUC are the same, then the signed responses SRES_1 and SRES_2 should be identical. If they are identical, then the RIM should be authorised for use during a current session on the network. Of course, authorisation is not normally provided if an IMSI has already been authorised for a currently open session on the network. But assuming that the IMSI is not already authorised for a currently open session, and the two signed responses are identical, then at step 400, the RIM holding that IMSI is authorised to use the network and the encryption/decryption key Kc is passed to the SGSN 50. A message is sent by the HLR/HSS 60 to the UE 10 to indicate that authorisation has been granted.

On the other hand, if either the IMSI is party to a currently open session that has already been authorised, or the two signed responses do not match, then the IMSI is not authorised for a connection session on the network. In this case, a non-authorisation message was passed to the UE at a step 410, and the version of the encryption/decryption key Kc generated by the AUC is not passed to the network for use in encrypting or decrypting communication with that UE.

Figure 7:
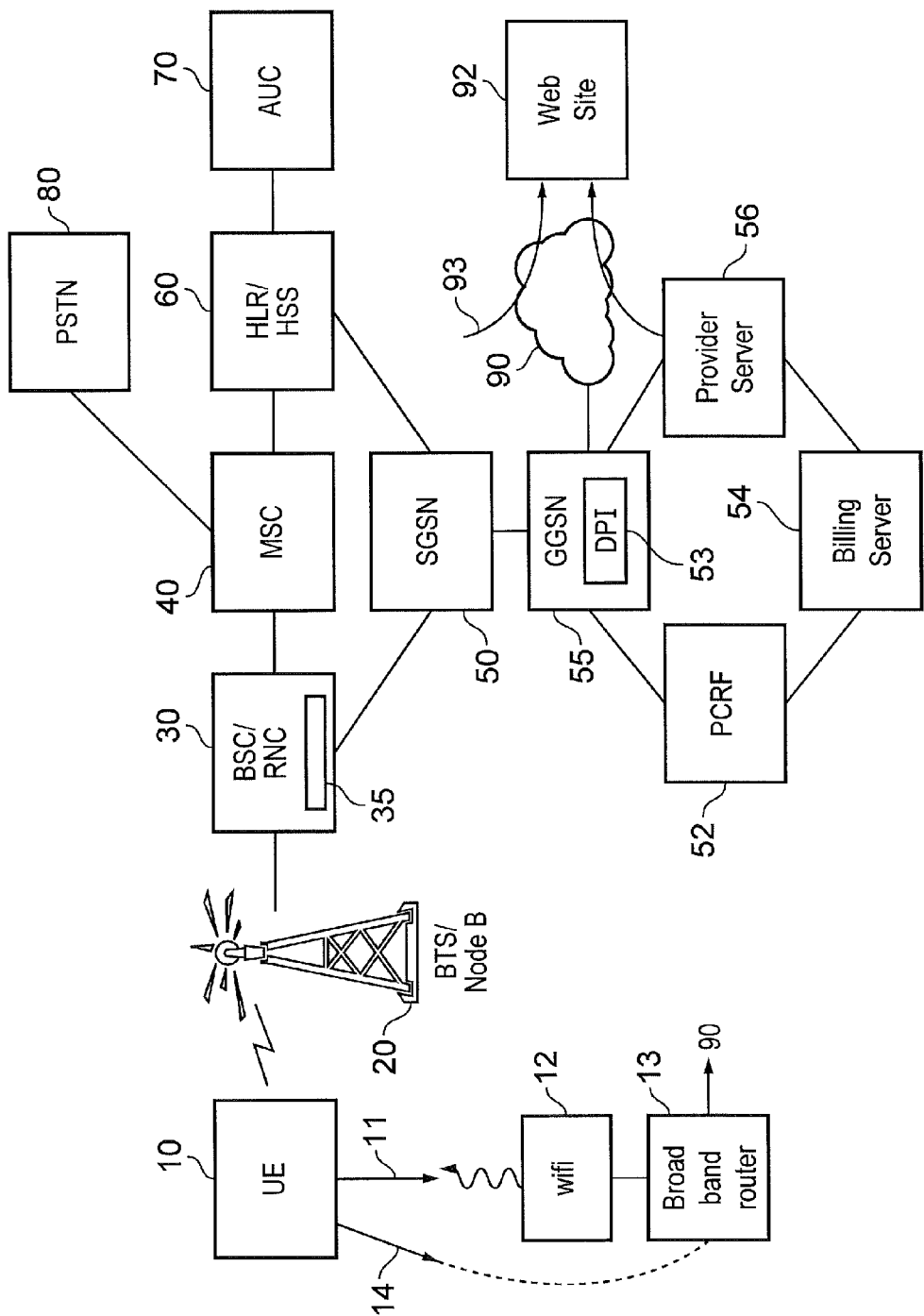
FIG. 7 is a more detailed schematic diagram of a mobile communications network.

FIG. 7 is a schematic diagram of an example of a mobile network showing arrangements for authorising data access.

The system of FIG. 7 is based around that shown in FIG. 1, with some additional features being depicted. The substantive differences will now be described.

The GGSN 55 includes a function of so-called "deep packet inspection" (DPI) 53 and is associated with a policy control rating function (PCRF) 52, a provider server 56 and a billing server 54. Together, these items provide an authorisation system.

A website 92, being a data server having a function of connecting to a client (such as the UE) subject to the UE identifying the current user of the UE (logging on), is connected to the Internet connection 90. Once logged on to the website 92, the user can view, download or upload content from/to the website 92. The website 92 is arranged to interact with client devices such as the UE 10 by an independent Internet connection 93 or via the mobile network and the GGSN 55.

The UE 10 is capable of connecting to the website 92 as a client via the mobile network. However, in this example, the UE also has the capability of a direct Internet connection 11 without using the mobile data network. Such a direct connection could be provided by, for example, a wireless network (Wi-Fi) connection 12 to a domestic broadband router 13 which in turn connects to the Internet 90. This is a common arrangement used in modern UE devices; typically, the UE can connect via the mobile data network when it is out of range of a Wi-Fi connection, but uses the Wi-Fi connection when it is available, because it is generally much cheaper for the user than the mobile data network connection. Although the broadband router 13 in FIG. 7 refers to as a domestic broadband router accessing a domestic Internet connection via ADSL (asynchronous digital subscriber loop) technology, an optical fibre connection or the like, it will be recognised that the Wi-Fi interface 12 and the router 13 may relate to a commercial Wi-Fi network (such as a network connection provided in an airport), to a corporate Wi-Fi network, to a hotel Wi-Fi network or the like. Indeed, various different options for providing a direct internet connection at the UE are envisaged, such as a wired Ethernet connection 14 or a wired connection to the broadband router 13.

Arrangements for data access to a website 92 made by the UE 10 over the mobile data network will now be described.

A data transfer process between the UE and an Internet site such as the website 92 is initiated (in this example) by packets of data sent from the UE 10 to the mobile data network. The packets contain routing information in known formats defining the destination of the packet transfer. The UE 10 sends such packets via the BTS 20 and the mobile data network to the GGSN 55.

The GGSN 55 analyses the received packets to establish their origin and destination. The GGSN achieves this by carrying out the so-called deep packet inspection process 53, which involves examining the contents (data content and/or header or routing data) of the data packets. The degree to which such inspection has to be carried out depends on the information which it is hoped to obtain. For example, data specifying the originating UE 10 and the ultimate destination (such as the website 92) is provided at a high level within the data packet structure. Data indicating the type of data transfer being undertaken is found at a deeper level within the data packet structure. DPI is an established technique and is described in: http://en.wikipedia.org/wiki/Deep_packet_inspection, the entire content of which is incorporated herein by reference.

The GGSN 55 consults the PCRF 52 to determine policies associated with different types of data transfer. The policies relates to two main questions: firstly, whether a particular data communication should be allowed at all; and secondly, who (if anyone) should pay for the data communication. To allow these functions to be determined, the PCRF 52 communicates with the billing server 54 which handles information relating to user billing accounts associated with each UE 10.

The control process therefore operates as follows:

(a) The GGSN 55 establishes the identity of the UE 10 carrying out the communication and the destination and/or type of communication being undertaken.

(b) The GGSN consults the PCRF to determine whether that particular type of communication is allowable.

(c) The PCRF compares the information defining the type of communication with a database of policies to determine whether the communication can go ahead and whether the communication is chargeable.

(d) The PCRF sends a signal back to the GGSN to confirm whether the communication can go ahead. The PCRF sends data to the billing server 54 relating to charges to be imposed on the user account relating to that UE 10. The charging data may depend upon the total data volume and/or data transfer time involved in the communication; these details are provided by the GGSN to the PCRF to allow the appropriate data to be sent to the billing server 54.

Not all data transfers are chargeable to the user. For example, accessing the mobile data network's own website is often provided as a free service to subscribers to that mobile data network. In such cases, the destination of the data communication is detected by the GGSN and passed to the PCRF, which determines from its stored rules that communication with that destination is not to be charged to the user.

In the arrangements which will now be described, a UE is operable to use one of a plurality of mobile identities, according to the factors including the user identity of a current user. To achieve this, one possibility is that the UE consults a separate server which securely provisions the IMSI and secret key data to the UE for use in respect of a current connection. In other words, the mobile device is operable to access a remote mobile identity database. Another possibility is that the UE holds a mobile identity database locally (at the UE) and makes use of a selected one of a plurality of possible mobile identities according to the user identity of the current user. A hybrid scheme makes use of a local and a remote mobile identity database. In a further possibility, a mobile identity is provided to the UE based on the user logging onto a website or the like, such that data access to the website may be free from the point of view of the user. An example infrastructure, and in particular an example of a mobile communications system comprising: a mobile device and one or more servers providing the mobile identity database, allowing some or all of these possibilities will now be described. In any of these cases, the mobile device can be considered as being operable to access a mobile identity database which provides a mobile identity to the reconfigurable user identification module for use as the primary mobile identity, in response to the detected user identity of the current user of the mobile device.

Figure 8:
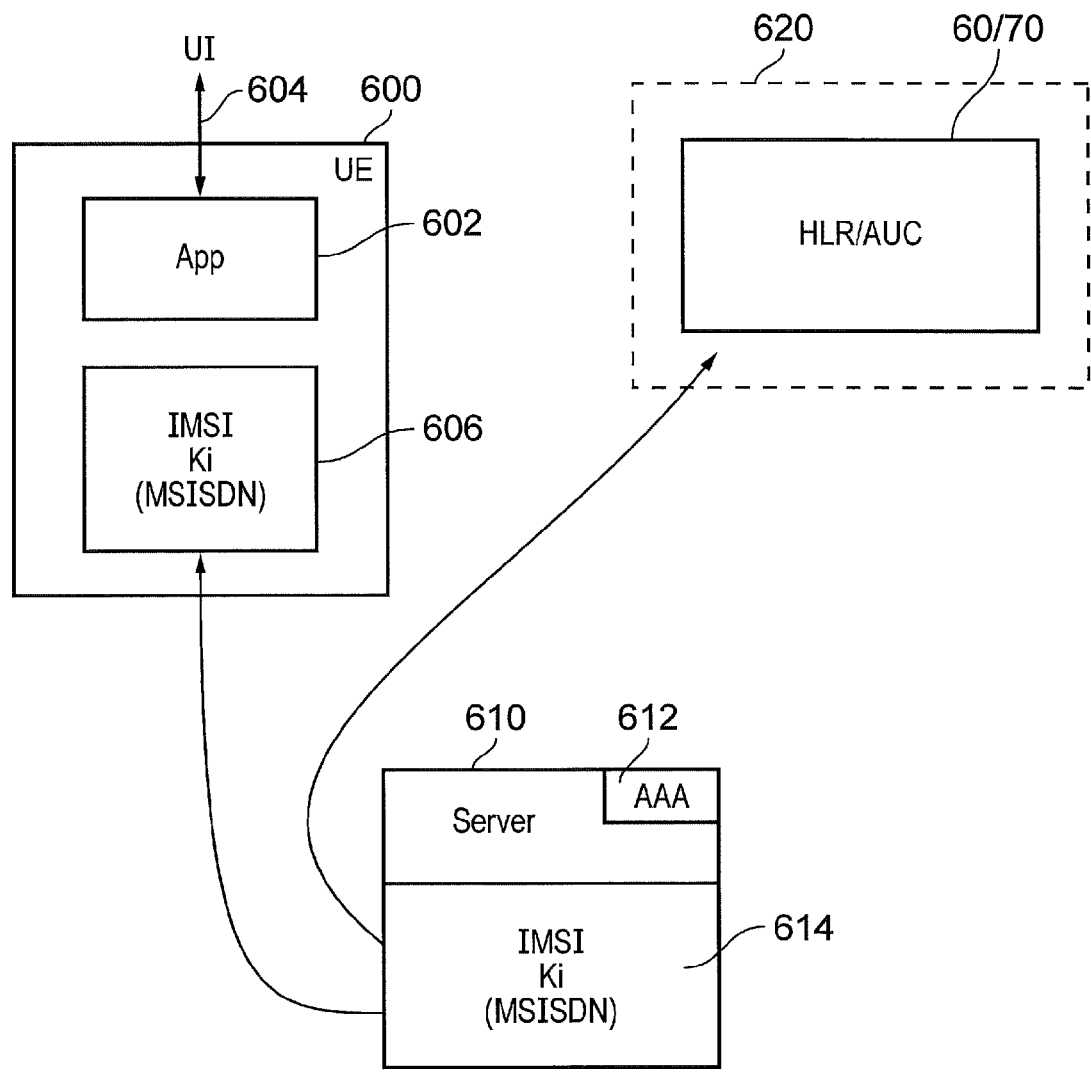
FIGS. 8 and 9 schematically illustrate information flow between a UE, a server and a mobile network operator (MNO)

FIG. 8 schematically illustrates information flow between a UE 600, a server 610 and a mobile network operator (MNO) 620, so as to allow the provisioning of a secret key to the UE from a source, such as the server 610, outside of the UE. The arrangement also allows the provisioning of the same secret key to the MNO, if that is required. Not all features of the UE are shown; some features that will be described include secure storage 606, an application or similar program for controlling the interaction of the UE with the server 610, and a user interface arrangement shown generically as 604 to allow interaction of the user with the UE.

The server 610 could be implemented as the provider server and/or the PCRF in FIG. 7, or as a separate server (or indeed as part of the MNO).

The description which follows relies on various technical features of the devices shown in FIG. 8:

1. Firstly, a secure data communication channel is required between the UE and the server, and between the server and the MNO. This data communication channel could be provided (as between the UE and the server) by encrypted communication over a mobile data channel, and/or by encrypted communication over a separate network or Internet channel, for example making use of a wired or wireless Internet connection (not shown). Techniques for achieving this will be described below.

In general terms, the provisioning of the secret key needs to be carried out in a very secure manner, as the secret key is fundamental to the secure operation of the mobile device and the prevention of fraud. Various techniques are available for achieving this. In one example, secure data packets in a proven over-the-air (OTA) data transfer mechanism such as the ETSI standard TS102 225 (the entire content of which is incorporated herein by reference) can be used, or a secure internet transfer can be employed. Other possibilities include providing multiple mobile identities at the RIM of the UE 600, so that the only data that needs to be sent between the server 610 and the UE 600 is data selecting one of those multiple identities rather than an identity itself. In a further option, a so-called root key can be provided at the RIM and the server 610, with secret keys being derived from the secret route key according to a certain algorithm and seed data (which might even be the MNC or MCC of the new identity) sent from the server 610 to the RIM of the UE 600.

2. Secondly, the server 610 has to be able to store and retain highly confidential information in a secure manner. This is carried out using known encryption and security techniques.

3. Thirdly, the UE and/or the RIM within the UE 600 accepts and stores data relating to the mobile identity associated with that RIM, which data can include secret information such as the secret key Ki. In other words, the mobile identity currently associated with the RIM of the UE 600 (which can be considered as a "primary" mobile identity stored at the RIM) can be altered by means of data downloaded from the server 610, such that the UE is then operable to carry out data transfer over the WWAN network according to the primary mobile identity (and subject to authorisation with an MNO). Secure storage 606 is provided at, or is associated with, the RIM to allow this.

The secure storage 606 can be implemented on the RIM, in a similar way to the storage 210, 220 and 230 shown in FIG. 4. In other embodiments, the secure storage 606 can be provided on the UE, with the RIM being capable of accessing data stored in the secure storage 606 in a secure manner.

The server 610 obtains the mobile identity-defining information (which in embodiments of comprises an International Mobile Subscriber Identifier number and an associated secret encryption key) as follows.

If an MSISDN is used (which is not necessarily the case in a data-only environment) the MSISDN remains, as far as possible, common to the user. That is to say, if the system allows for different mobile identities to be provided to the UE 600 and the MNO 620 by the server 610 in respect of the same user (for example, for use in different geographical areas) then they will use the same MSISDN number, so that the user may maintain a consistent telephone number. For data access only, the MSISDN is irrelevant and can change without affecting the user's operation. Or the RIM may not even have an associated MSISDN if used for data transfers only. But if the RIM does have an associated MSISDN, the cancellation of any previous registrations of that MSISDN when a new IMSI or secret key is provisioned can avoid inconsistencies across different mobile networks.

Of course, in instances where the user moves from one country to another, a different MSISDN can be provided in respect of any newly-entered countries.

As regards the IMSI and the key Ki, the server 610 can generate these using known IMSI and Ki generation algorithms.

The transfer of secret keys between the server 610, the UE 600 and the MNO 620 can be handled as follows, bearing in mind that many specific details are to be found in respect of devices such as the so-called embedded UICC (eUICC).

Some of the techniques assume that the user already has an operational mobile identity, which may be a mobile identity used only for the purposes of negotiating, with the server 610 to provide a mobile identity for actual data transfer, or which could be a previously used mobile identity which is about to be overwritten by a mobile identity newly acquired from the server 610. Alternatively, the UE may allow internet connections via a wired local area network (LAN) or a wireless LAN or "WiFi" connection. Using this mobile identity or the other routes just discussed, a connection is formed between the UE 600 and the server 610 over an internet connection. So there is a need to secure this connection.

As a first possibility, the UE connects to the server using a WWAN mobile data network connection based on a currently operational mobile identity. The transfer can then happen via traditional methods such as OTA or via OTI (over the internet), with possible involvement of mechanisms such as BIP (Bearer Independent Protocol).

As a second possibility, the UE communicates with the server 610 via a so-called Authentication, Authorization and Accounting (AAA) server 612, which may be implemented as a function of the server 610 (as it is shown schematically in FIG. 8) or as a separate AAA server connected to the server 610 by a secure data connection. The UE uses the so-called EAP-SIM (Extensible Authentication Protocol [Method for GSM] Subscriber Identity Module).

EAP-SIM uses a SIM-based authentication algorithm between the UE and the AAA server associated with the server 610, with the AAA server providing mutual authentication between the UE and the server 610. In EAP-SIM the communication between the RIM and the AUC replaces the need for a pre-established secret between the client and the AAA server. This technique can provide a secure data link between the UE and the server 610 and can be used to exchange the secure keys over a secure non-WWAN access medium (this is used to provide approximately the same level of security as a transfer via a WWAN access channel).

A conventional secure data link is established between the server 610 and the HLR/HSS/AUC of the MNO 620.

As a third possibility, the UE connects to the server 610 using known arrangements such as the so-called PEAP (Protected Extensible Authentication Protocol) or LEAP (Localized Encryption and Authentication Protocol) systems (and having already a secure token at hand—not the SIM Ki).

Both of the second and third possibilities mentioned above can be used by a user wishing to change his RIM over a non-WWAN access medium.

In embodiments, two current sets of mobile identity data are stored in secure storage 606, namely a set A and a set B. The reason why two such sets can be useful will now be described.

When the user first purchases the UE, the user may need some way of establishing a first mobile data network connection in order for the secure interaction with the server 610 to be initially established. The mobile identity A, which may be referred to as a "boot" mobile identity and which corresponds to a particular initial MNO and tariff (for example, a pay-as-you-go tariff with an initial starting credit sufficient to carry out the initial registration of the UE) is used in this first instance. At this stage, the mobile identity B (the "service" mobile identity) may be unpopulated. Then, when the user first undertakes the process shown in FIG. 9 or FIG. 10, the mobile identity A is not deleted but is rendered dormant, as long as the mobile identity B is populated. If the user repeats the process shown in FIG. 10, that is to say the user replaces a current mobile identity with a new mobile identity, then it is the mobile identity B which is overwritten by the newly provided mobile identity provided by the server 610. Accordingly, the RIM is operable to overwrite a current mobile identity with a mobile identity newly received from the server 610. In this regard, as described above, the reconfigurable user identification module (RIM) is operable to store at least a current primary mobile identity (the mobile identity B in the example just described), the mobile device being operable so as to provide mobile data communication via a mobile network subject to the primary mobile identity being authorised with the mobile network. As noted, however, the RIM may also hold one or more further mobile identities.

In embodiments, the boot mobile identity (A) remains active—at least in the sense that it is used for handling the data exchanges with the server 610 involved in any transition of the other mobile identity (B) from one mobile identity to another. In other embodiments, the boot mobile identity (A) is also used for handling any communication with the server 610, to avoid the user necessarily being charged for such data access, so that the RIM may be considered as being operable to store a primary mobile identity for providing mobile data communication and a further mobile identity, the reconfigurable user identification module being arranged to use the further mobile identity at least for communication with the account control server in respect of changes to the primary mobile identity.

At the time that the mobile identity stored by the RIM of the UE 600 is changed to a new mobile identity, care needs to be taken to ensure that there is continuity of network availability for the purposes of implementing the change. This can be achieved either by use of the mobile identity A or (in a single mobile identity arrangement) by using the previous mobile identity until it is overwritten by the new one.

So, with all of the relevant parts of the network now described, the steps involved in the interaction between the UE, the server 610 and the MNO 620 will now be discussed.

Figure 9:
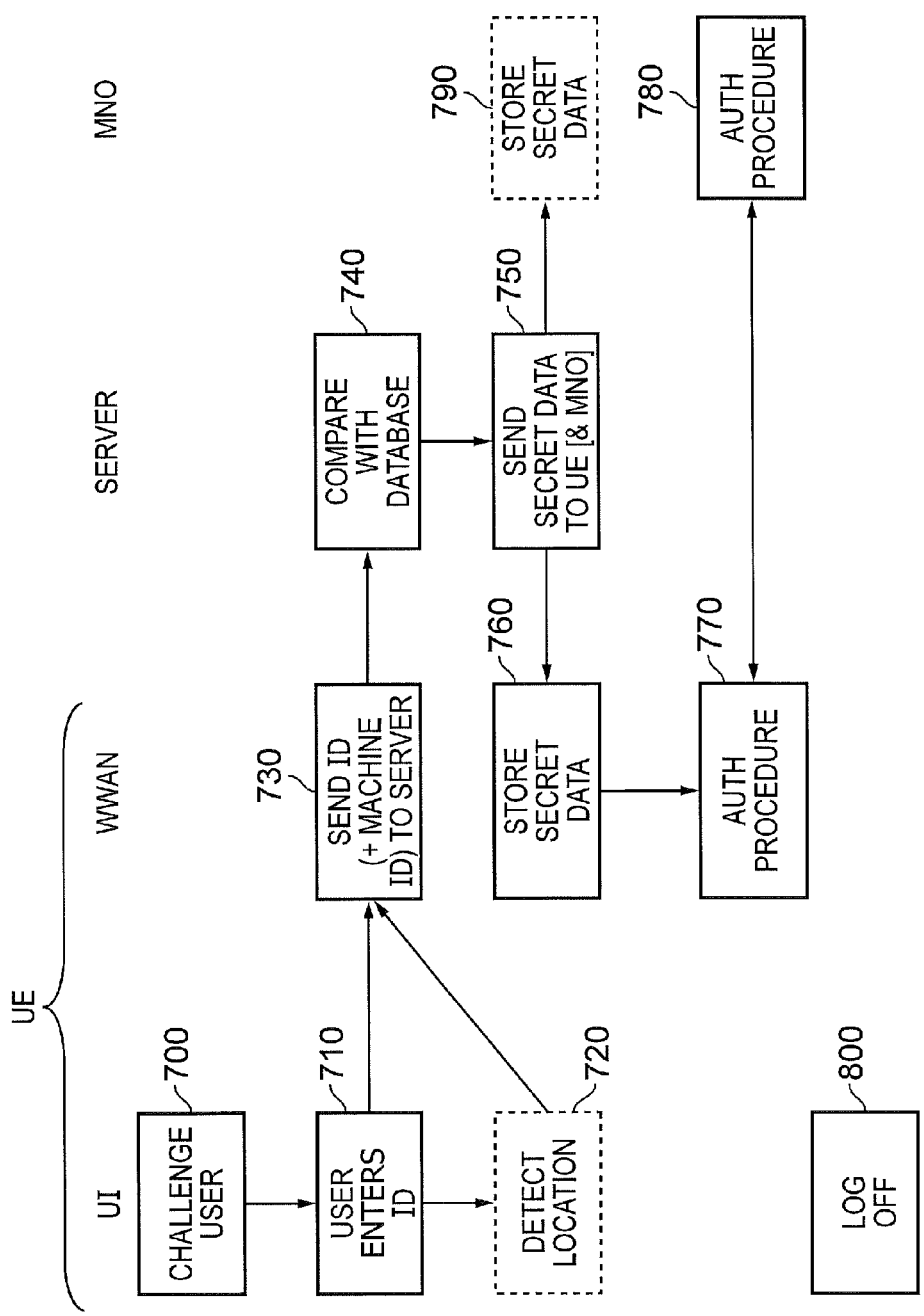

Various different variations on this interaction will be described. In a first example, shown in FIG. 9, the UE 600 interacts with a mobile identity database 614 held by the server 610 to obtain secret data such as the key Ki to allow the UE to make a data connection to the mobile network. In FIG. 9, the left-hand two columns relates to operations carried out at the UE. The third column relates to operations at the server 610 and the fourth column relates to operations at the MNO 620.

The first stage of operation is for the user to identify himself. At a step 700, the user interface of the UE "challenges" the user. This is a generic term used here to indicate that the user interface requests identification information from the user. For example, the user interface might display a data entry screen requesting a user ID and a password. Other examples will be described below. At a step 710 the user identifies himself. Again, various ways in which this can be achieved will be described below. This process can be considered as a detection of the user identity of a current user of the mobile device.

Optionally, at a step 720, the UE detects its current location, for example using the location detector 144.

At a step 730, the UE sends data defining the current user and optionally data defining the UE and/or data defining the UE's current location to the server 610 using the WWAN processor and the wireless interface. The server receives this data and, at a step 740, compares at least the user identification with the mobile identity database 614. Accordingly, as an optional feature, the mobile identity database is operable to provide a primary mobile identity in dependence upon a geographical location of the mobile device.

The mobile identity database can be a simple list of user identifications and associated mobile identities. In other embodiments, it can be more sophisticated than this, for example by linking user identifications to machine identifications (identifications of UEs) on which that user is allowed to operate, so that the device and/or the mobile identity database is operable to maintain a list of user identities which are allowed to use the mobile device. This can be a useful guard against fraudulent use of a user's credentials on an unauthorised machine. Again, a level of subtlety can be provided such that more than one mobile identity is stored in respect of a particular user, with the choice being linked, at least in part, to the location data generated at the step 720, so that, for example, different mobile identities can be selected in respect of the country in which the user is currently located.

If the current user is not found in the mobile identity database at the step 740, the process can simply abort, which is to say that no reply is sent by the server to the UE. Alternatively, in a further step (not shown) the server can send an error message back to the UE for display to the user, to say that the user's identity cannot be found in the mobile identity database and so a mobile data connection has not been made.

Assuming, however, that an appropriate mobile identity can be located for the current user in the mobile identity database, the server sends at least the secret data relating to that mobile identity to the UE at a step 750, for example using a secure technique described above. At a step 760 the UE stores the secret data as described above, in a secure manner, and at a step 770 uses the secret data to undergo an authorisation procedure with the MNO. The MNO co-operates with the authorisation procedure at a step 780. Once the UE is authorised with the MNO, data communication can take place using the data supplied by the server 610.

Optionally, at the step 750, the server can send the same secret data to the MNO, which stores it at a step 790. This part of the process is not required if the secret data held at the server relates to mobile identities which have already been registered with the MNO.

Returning to the step 750, in embodiments the server 610 actually sends an IMSI and a secret key Ki to the UE. The IMSI and the key relate to the same mobile identity, which may be a mobile identity which has already been registered with the MNO or may be supplied to the MNO via the steps 750, 790.

There may be multiple mobile identities available to (stored in respect of) a user, stored at the server (in the mobile identity database) or, in the context of a locally held database, at the UE. It is possible for the database to include cost information defining the cost, at the user's current geographical location, or at the current time of day, for each possible mobile identity and to select a primary mobile identity, from a group of two or more possible primary mobile identities, in dependence upon the cost, to the user, of mobile data access using each of the possible mobile identities (for example, to give the lowest cost for the current location and/or time of day).

In some embodiments, the UE continues to use the mobile identity supplied at the step 750 until the user logs off the UE, shown schematically as a step 800. At that time, one possibility is that the secret data stored at the step 760 is deleted. Another possibility is that the mobile identity relating to that user is disabled from being used, but is held in a temporary or permanent mobile identity database for buffer at the UE in case that same user logs on to the UE again. In other embodiments, the UE can keep a record of the number of times that a particular user has logged onto the UE; for the first n instances, the secret data is deleted at log-off, but for the subsequent instances of the user logging on and off, the secret data is buffered. This avoids buffering the mobile identity of very occasional or single-use users but does allow for the buffering of mobile identity data relating to frequent users of the UE. The UE can provide the user with an optional control which, when operated by the user, causes the deletion (at that UE) of that user's buffered mobile identity.

As mentioned above, in some embodiments a mobile identity can be provided not only in response to the user's identity but also in response to a website which the user is logging into. In such an arrangement the mobile identity database is operable to provide a primary mobile identity in response to initiation, by the user, of a data communication service using the mobile device. As an example, the user may have a paid account with a music streaming service, such that the user's subscription covers any mobile data costs to access the service (possibly restricted to access within a home country). Embodiments allow this to be achieved by the music streaming service to define a mobile identity to be provisioned to the user in response to the user logging onto the service's website, for the purposes of accessing the streaming service website. In other examples, a user might be "rewarded" with free access for a period if the user browses an advertising website or the like. Or the UE manufacturer might allow free access to their own website under certain conditions or as part of a wider subscription model.

Figure 10:
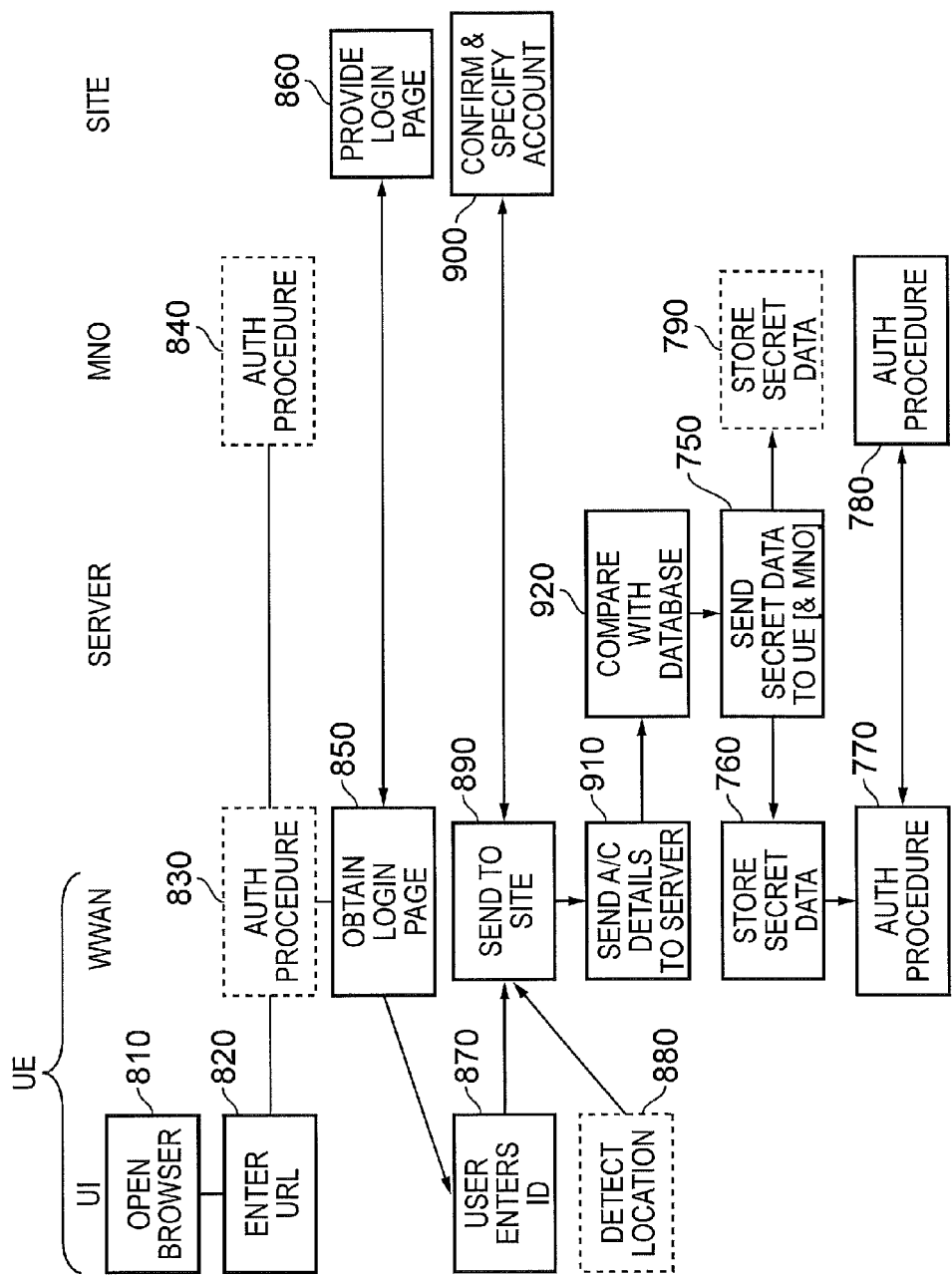
FIG. 10 schematically illustrates information flow between a UE, a server, an MNO and a web site.

FIG. 10 relates to a similar procedure but this time part of the interaction involves an external website such as the website 92 shown in FIG. 7. Many of the steps shown in FIG. 10 are substantially identical to corresponding steps in FIG. 9. These will be indicated by identical reference numerals and will not be described in detail again. In FIG. 10, the column notation is the same as that of FIG. 9, except that the right-most column relates to operations carried out at the website 92.

At a step 810, the UI of the UE opens a web browser. This may be an automated operation or might occur in response to a command by the user. A URL is entered at a step 820. Again, this could be manually typed by the user or could be provided automatically by the device.

At a step 830, the UE undergoes an authorisation process with the MNO, which responds at a step 840. To achieve this, the UE requires a mobile identity. However, the mobile identity to be used for substantive data communication has not yet been allocated to the UE by the server; that stage occurs further down the process is shown in FIG. 10. So, a different mobile identity is required for the purposes of the initial stages of FIG. 10. This can be a separate mobile identity which is kept simply for this purpose; such a separate mobile identity may be referred to as a "boot" mobile identity as described above and is used simply for interactions leading to the allocation of a full mobile identity for use in substantive data communication by the server. Alternatively, the mobile identity used for the initial interaction can be the previously registered mobile identity, which is to say, the mobile identity of the previously logged in user. In a further alternative, the initial steps of FIG. 10 can be carried out over a Wi-Fi or wired broadband link rather than by a mobile data connection. In other words, the reconfigurable user identification module is operable to store the primary mobile identity for providing mobile data communication on behalf of the user and a further mobile identity, the reconfigurable user identification module being arranged to use the further mobile identity at least for communication with the remote mobile identity database in respect of changes to the primary mobile identity.

Once the authorisation procedure 830, 840 has been completed, the UE can connect to the website over the mobile data connection and, at a step 850, the UE obtains a login page from the website 92, which provides the required page data to the UE at a step 860. The UE displays the login page to the user who, at a step 870, enters login data such as a user ID and a password. Optionally, the UE can detect its location at a step 880. At a step 890, the user login data, optionally a machine identifier and optionally location data are sent to the website 92 which, at a step 900, confirms their validity and response by specifying a mobile data account to be used for data access to that website. As a step 910, the UE sends details of the mobile data account specified by the website 92 to the server 610. The server compares (at a step 920) the account details with a mobile identity database to establish whether a valid mobile identity is held in respect of that account. (The UE can send a user identifier, a machine identifier and/or a location to the server at the step 910, and these additional data items can be used at the step 920 to verify the account details provided by the website 92.)

If there is no valid entry in the mobile identity database at the step 920, then the process can be aborted and/or an error message can be sent to the UE for display to the user. Assuming however that a valid entry is found, then the steps 750 . . . 790 from FIG. 9 are repeated. This results in the UE being connected with a mobile data connection according to the account details specified by the website 92.

The connection can continue until, for example, the user logs off or disconnects from the website 92. Alternatively, the connection can continue for a predetermined time period such as 30 minutes. This could relate (for example) to 30 minutes' connection to the website 92, or to 30 minutes' connection to any website—for example as a reward for visiting an advertising website. Similar limits can be placed on the amount of data transferred so that, for example, a user may be entitled to (say) 100 MB of data transferred during the user's interaction with the website 92.

The examples given above have related to mobile identity databases stored remotely from the UE, for example at a server. The server has been described as being separate to the MNO, but this is not necessarily the case in all embodiments; the server could be implemented as a part of the MNO's infrastructure. In other embodiments, different mobile identities may be held at the UE itself. In some instances this may represent the primary or indeed only source of mobile identity data which can be selected at that UE. In other embodiments, the locally held mobile identity data can provide a cache of mobile identity data for the most recently or most commonly used mobile identities at that UE, with a remote server providing less recently or less commonly used mobile identities.

Figure 11:
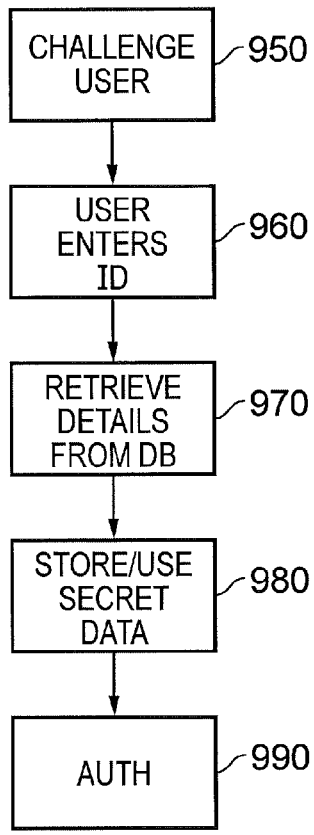
FIG. 11 schematically illustrates an authorisation process carried out at a UE.

FIG. 11 schematically illustrates steps carried out by a UE which holds a local copy of mobile identity data for different users.

At a step 950, the UE challenges the user in a similar way to the step 700 described above. At a step 960, the user enters identification information in a similar way to the step 710 described above. As a step 970, the UE retrieves mobile identity data from a locally held mobile identity database, for example forming part of the UE or mobile device. This can be based upon the user identification and optionally the location of the UE. If no valid entry is found, then the process aborts and, optionally, an error message can be displayed to the user. If, however, a valid entry is present in the mobile identity database then the mobile identity selected for the current user is stored in the RIM, if not already present, or is simply selected for use by the RIM, at a step 980. At a step 990, an authorisation procedure takes place with the appropriate MNO to allow a data connection to be opened using the selected mobile identity. The selected mobile identity continues to be used until the user logs off or the UE is shut down.

Figure 12:
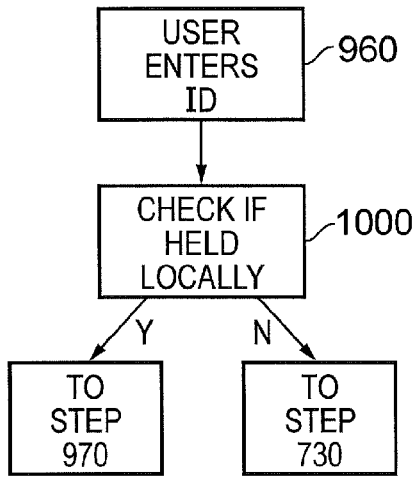
FIG. 12 schematically illustrates steps carried out at a UE which stores a local database and can access a remote database.

In embodiments, there may be a local buffer of mobile identity data forming a mobile identity database at the UE, along with a remote server providing a mobile identity database. FIG. 12 schematically illustrates additional steps which may be carried out in this situation.

FIG. 12 starts with the step 960 from FIG. 11. At a step 1000, the UE checks whether the user identity entered at the step 960 corresponds to a valid entry in the locally held mobile identity database. If so, then control passes to the step 970 of FIG. 11. If not, then control passes to the step 730 of FIG. 9 for the attempted retrieval of a mobile identity from the remote mobile identity database.

Figure 13:
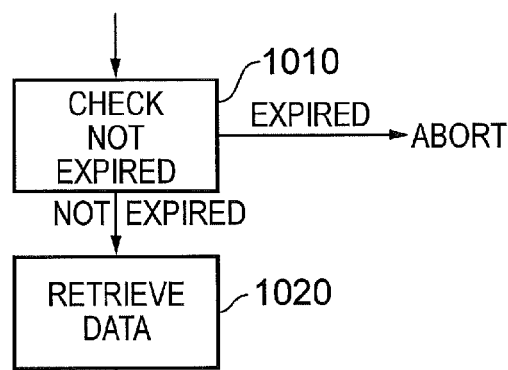
FIGS. 13 and 14 schematically illustrates steps to check whether a data entry has expired.

In some embodiments, the stored mobile identities may have an associated expiry date or time. As an example, the expiry date may be associated with the end of a period for which data access has been prepaid by the associated user. FIG. 13 schematically illustrates additional steps which may be used in this situation. In particular, the steps 1010 and 1020 of FIG. 13 form part of the process of retrieving details from the mobile identity database (the steps 740, 920 or 970 described above). At the step 1010, a check is carried out to see whether a mobile identity associated with the current user identification has expired, or in other words has reached or exceeded its expiry date or time. If it has expired, then the process may be aborted, or alternatively a search may be carried out for another non-expired mobile identity associated with that user. However, if the mobile identity has not expired, then the details are retrieved from the database at the step 1020.

Figure 14:
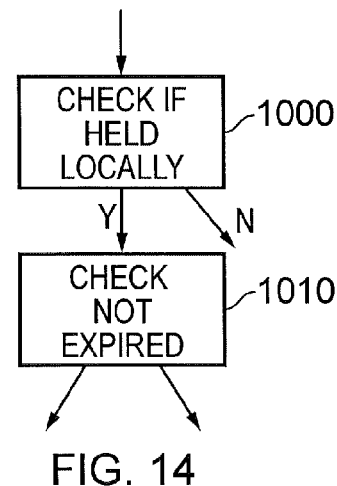

FIG. 14 simply illustrates a combination of the processes of FIG. 12 and FIG. 13, in that a first check can relate to whether a mobile identity for the current user is held locally. If so, the check of step 1010 is carried out to detect whether the mobile identity has expired.

FIG. 15 schematically illustrates an example of a mobile identity database held at the UE. The database comprises sets of data, one or more sets for each of a plurality of user identities, each having reference data 1100, details of the user identity to which the set applies (1110), secret key data and an IMSI 1120 and optionally an expiry date or time 1130. The whole database may be held in secure storage at the UE, optionally within the RIM itself. The reference data 1100 can relate, for example, to geographical information defining which of a set of two or more mobile identities should be used for a particular user in different geographical areas.

In operation, the user identity 1140 obtained from the UI is compared with the user identities 1110 in the mobile identity database. If applicable, the current time or date obtained from (for example) a real-time clock held by the UE is compared with the expiry date 1130. Again, if applicable, location data relating to the UE is compared with the reference data 1100. When these checks have been carried out, the appropriate set of secret data and IMSI are supplied to and/or enabled for use by the RIM.

A mobile identity database held by a remote server can have a corresponding data format to that shown in FIG. 15.

FIGS. 16 and 17 schematically illustrate possible ways in which a locally held mobile identity database may be populated. Of course, one way is for the mobile identity database to be populated before purchase. This could be as part of the manufacturer of the UE itself, or a RIM holding multiple mobile identities arranged in a mobile identity database format could be provided for installation within the UE. If neither of these applies, however, appropriate mobile identity information needs to be introduced into the locally held mobile identity database in a secure manner.

Referring to FIG. 16, one technique for populating a locally held copy of the mobile identity database has already been alluded to in the description above. In particular, at a step 1200 the UE receives a mobile identity in respect of a current user from the remote server. A step 1210 corresponds to the steps 760 in FIGS. 9 and 10, in that the received data is stored for current use in respect of current data communication. However, at a further step 1220, a copy of the data is stored to a secure local database of the type shown in FIG. 15.

Another technique is schematically illustrated in FIG. 17. Here, a locally held mobile identity database 1230 can be populated with a user's mobile identity by a one-time insertion of that user's SIM card 1240 into a socket 1250 associated with the UE 600. It is not generally possible to make a direct copy of the secret key data from a SIM card. So, the process is not quite as simple as merely reading secret data from the SIM card 1240 and storing it in the database 1230. The IMSI can be read and stored in this way by a SIM reader 1260, but the way in which the secret key data is obtained is slightly more complicated.

In basic terms, the WWAN processor 130 of the UE initiates an authorisation process with the MNO. The MNO then instructs the server 610 to send the secret data corresponding to the currently inserted SIM card to the UE, using the secure techniques discussed above. The secret data is stored in the local mobile identity database 530 alongside the IMSI for the currently inserted SIM card. The SIM card 1240 can then be removed from the socket 1250. During this process, the user is prompted to provide user-identifying data such as an ID and a password, which is used to control access to the securely stored IMSI and secret data relating to that user's mobile identity.

Figure 18:
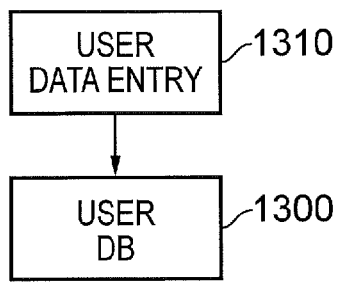
FIG. 18 schematically illustrates a data entry process.
Figure 19:
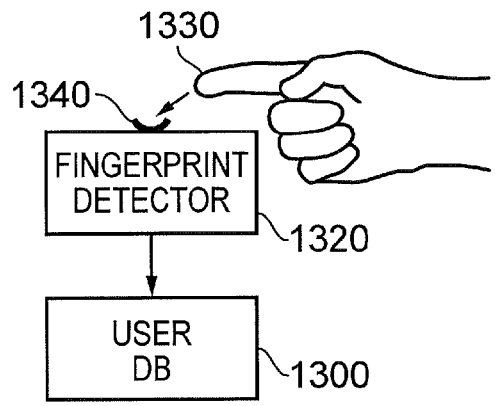
FIG. 19 schematically illustrates a fingerprint detection process.
Figure 20:
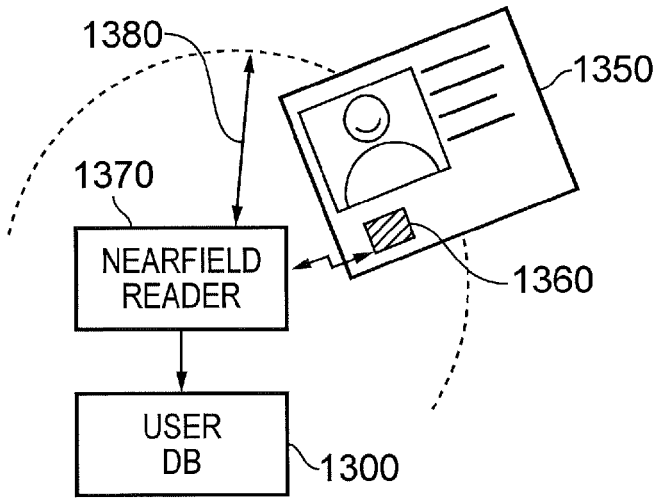
FIG. 20 schematically illustrates a smart card detection process.

FIGS. 18-20 relate to various ways of providing user identity data, and in each case describe a detector to detect the user identity of a current user of the mobile device. In each case, the data which is gathered is passed to a user database 1300 which simply maps the gathered data (such as a user ID and a password) to a standard format of a unique or quasi-unique user identification. In the examples to be described, the user identity may be detected in response to one or more of: user entry of user-specific data such as a password and/or user ID; detection of a biometric parameter of the user such as a fingerprint (though other parameters such as parameters provided by facial recognition could be used); and detection of a radio frequency identification token within a threshold distance of the mobile device. In other words, two or more of the following arrangements could be employed, with, for example, both arrangements needing to identify the same user in order for that user to be considered properly detected, or alternatively any one of a set of two or more detectors could provide a successful detection of a user.

FIG. 18 relates to the type of identification data discussed in the examples above, in that the user enters (at a step 1310) personal information such as a user ID and a password using the conventional UI of the UE.

FIG. 19 schematically illustrates the use of biometric data—in this case, a fingerprint detector 1320 is provided such that the user places his finger 1330 onto a detection area 1340 of the fingerprint detector 1320. The finger print detector 1320 derives a set of characteristic data from the user's finger and passes it to the user database 1300 for mapping to a particular user identification.

FIG. 20 schematically illustrates the use of a radio-frequency token such as a smartcard 1350 having a radio-frequency identification (RFID) transceiver 1360. The UE includes a near field radio-frequency communication unit 1370 which operates within a certain radius 1380 (for example, 20 cm) to communicate with the transceiver 1360 in a card or device brought within the operating radius 1380. The reader 1370 then reads data defining the holder of the card 1350 from the transceiver 1360 and passes that data to the user database 1300.

Figure 21:
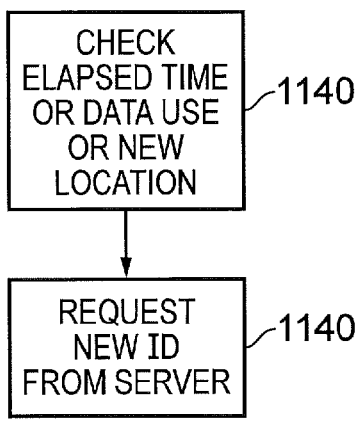
FIGS. 21 and 22 schematically illustrate an elapsed time or data use check.
Figure 22:
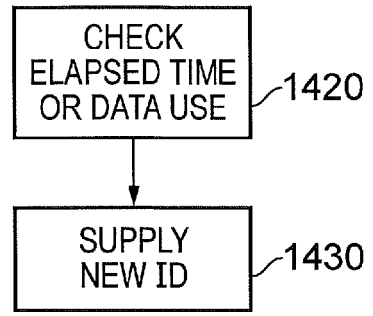

FIGS. 21 and 22 schematically illustrate arrangements which lead to the use of a new mobile identity by the UE. FIG. 21 relates to an arrangement where the UE obtains mobile identity data from a remote server. At a step 1400, the UE checks the elapsed time since the last identity was newly obtained from the server, or the data use since then, or a change in the location of the UE. In response to either the elapsed time or data use exceeding a threshold or the location changing by a predetermined distance or to a new country, the UE stops using the current mobile identity for substantive data communication and requests a new mobile identity from the server (at a step 1410). The request to the server can be made using the current mobile identity, if required. It may be that the server responds with the same mobile identity once again, or a different mobile identity, or an abort message. In either of the above arrangements, the mobile identity database is operable to change the primary mobile identity in use by a particular user from an initial primary mobile identity to a replacement primary mobile identity after either a predetermined period of use and a predetermined quantity of data transferred using the initial primary mobile identity.

FIG. 22 schematically illustrates an arrangement applicable to a locally held database at the UE. At a step 1420 the UE checks the elapsed time or data use since a previous mobile identity was enabled. If the elapsed time or data use exceed a threshold, then the mobile identity database supplies a new mobile identity for use by the UE at a step 1430.

FIG. 23 schematically illustrates a circuit board 1500 having an embedded RIM 1510. Such a circuit board could be mounted within a UE of the type shown very schematically in FIG. 24, which provides an outer casing 1520, possibly with controls or displays 1530, but without providing access for the user to remove or replace the RIM 1510. Alternatively a removable RIM can be used with the same functionality as described throughout the present specification, except that the RIM can be removed (and optionally replaced) by the end-user. This arrangement would allow compliance with competition law requirements for open internet access with only one SIM, and/or could be a useful solution for device vendors who do not wish to change their hardware designs but who still want to make use of the RIM functionality. Another alternative is a software RIM to be described below.

While the description above has referred to RIMs, IMSIs and Kis, these terms are sometimes considered to relate to particular network standards or protocols. It will be appreciated that any type of identification module and mobile identity data fulfilling the basic requirements of identifying a node on a data network may be used in embodiments. In particular, where appropriate, the term "RIM" or "RIM card" can be replaced by "UICC" in the description above.

The discussion above has related generally to physical RIM devices. Hardware RIMs of this type rely on physical security provided by a secure hardware arrangement to store and handle secret keys and the like in a tamper-proof manner. However, it is possible to implement a RIM as one or more software processes, which in embodiments are implemented by a secure data processing device, to provide a "software RIM".

With a software RIM, a processor within the secure data processing device (forming part of the UE) has a secure memory and stack, and routes software calls for RIM functionality internally using the secure memory and stack, so as to avoid problems of tampering with the secure data.

Using such a software RIM, it could be considered that the functionality or the mobile identity of the RIM is such that the software RIM can provide that IMSI-Ki pairs are downloadable. Accordingly, a software RIM could be used as the RIM. This arrangement can be used to change the MNO accessed by the RIM function. Alternatively, of course, a hardware RIM (removable or not) may be used.

The techniques described above may be implemented in hardware, software, programmable hardware such as application specific integrated circuits or field programmable gate arrays, or combinations of these. It will be understood that where the techniques are implemented, at least in part, by software or the like, then such software and providing media (such as non-transitory machine-readable storage media, for example magnetic or optical disks) by which such software is provided are considered as embodiments of the present technology.

Although the techniques have been described in respect of devices using data services, the UE could comprise one or more audio transducers and an audio data encoder and decoder; and at least some of the data transferred over the mobile data network could comprise encoded audio data handled by the audio data encoder and decoder.

It will be appreciated that although examples have been described with respect to particular mobile telecommunications standards, the disclosure is not limited to a particular standard, and is applicable to various arrangements in which an identification module carries a mobile identity. Examples of identification modules in various formats include the Universal Integrated Circuit Card (UICC) in UMTS, while the Removable User Identity Module (R-UIM) is used in some CDMA (code division multiple access) systems.

In general terms, it is envisaged that RIMs could be incorporated within many types of UE, ranging perhaps from more conventional data handling devices such as personal digital assistants through to applications of data communication which are perhaps less common at the time of filing the present application, such as satellite navigation devices or microwave ovens. The particular type of UE in which the RIM is provided is not technically relevant to the present technology. The UE containing the RIM can be considered as a mobile device having a configurable (or reconfigurable) user identification module operable to store a mobile identity, the mobile device being operable so as to provide mobile data communication via a mobile network selected from a set of available mobile networks, subject to the mobile identity being registered with the selected mobile network.

Thus, the foregoing discussion discloses and describes merely exemplary embodiments. As will be understood by those skilled in the art, the present technology may be embodied in other specific forms without departing from the spirit or essential characteristics thereof. Accordingly, the disclosure is intended to be illustrative, but not limiting of the scope of the disclosure, as well as other claims. The disclosure, including any readily discernible variants of the teachings herein, defines, in part, the scope of the foregoing claim terminology such that no inventive subject matter is dedicated to the public.

Embodiments of the present disclosure can provide features set out in the following numbered paragraphs:

1. A mobile data communications device comprising:
   a reconfigurable user identification module operable to store at least a current primary mobile identity, the mobile device being operable so as to provide mobile data communication via a mobile network subject to the primary mobile identity being authorised with the mobile network; and
   a detector to detect the user identity of a current user of the mobile device;
   the mobile device being operable to access a mobile identity database which provides a mobile identity to the reconfigurable user identification module for use as the primary mobile identity, in response to the detected user identity of the current user of the mobile device.

2. A device according to paragraph 1, in which the detector is operable to detect a user identity in response to one or more of:
   user entry of user-specific data;
   detection of a biometric parameter of the user; and
   detection of a radio frequency identification token within a threshold distance of the mobile device.

3. A device according to paragraph 1 or paragraph 2, in which the mobile identity database is operable to provide a primary mobile identity in dependence upon a geographical location of the mobile device.

4. A device according to any one of paragraphs 1 to 3, in which the mobile identity database is operable to provide a primary mobile identity in response to initiation, by the user, of a data communication service using the mobile device.

5. A device according to any one of the preceding paragraphs, in which the mobile identity database is operable to select a primary mobile identity, from a group of two or more possible primary mobile identities, in dependence upon the cost, to the user, of mobile data access using each of the possible mobile identities.

6. A device according to any one of the preceding paragraphs, in which the mobile identity database is operable to change the primary mobile identity in use by a particular user from an initial primary mobile identity to a replacement primary mobile identity after either a predetermined period of use and a predetermined quantity of data transferred using the initial primary mobile identity.

7. A device according to any one of the preceding paragraphs, the device being operable to access a remote mobile identity database.

8. A device according to paragraph 7, in which the reconfigurable user identification module is operable to store the primary mobile identity for providing mobile data communication on behalf of the user and a further mobile identity, the reconfigurable user identification module being arranged to use the further mobile identity at least for communication with the remote mobile identity database in respect of changes to the primary mobile identity.

9. A device according to any one of the preceding paragraphs, in which the device and/or the mobile identity database is operable to maintain a list of user identities which are allowed to use the mobile device.

10. A device according to any one of the preceding paragraphs, in which the mobile identity comprises an International Mobile Subscriber Identifier number and an associated secret encryption key.

11. A device according to any one of paragraphs 1 to 6, the device comprising the mobile identity database.

12. A mobile communications system comprising:
    a mobile device according to any one of paragraphs 1 to 10; and
    one or more servers providing the mobile identity database.

13. A system according to paragraph 12, in which the one or more servers are operable to store multiple mobile identities in respect of an individual user.

14. A method of operation of a mobile data communications device, the method comprising:
    a reconfigurable user identification module storing at least a current primary mobile identity for use by the mobile device for providing mobile data communication via a mobile network subject to the primary mobile identity being authorised with the mobile network;
    detecting the user identity of a current user of the mobile device; and
    accessing a mobile identity database which provides a mobile identity to the reconfigurable user identification module, for use as the primary mobile identity, in response to the detected user identity of the current user of the mobile device.

15. Computer software which, when executed by a computer, causes the computer to implement the method of paragraph 14.

The invention claimed is:

1. A mobile device comprising:
   circuitry configured to
      detect a user identity of a current user of the mobile device based on a user input, and
      access a mobile identity database, which is configured to store mobile identities and associated user identities, to obtain a first mobile identity associated with the detected user identity by searching the mobile identity database for the detected user identity; and
   a reconfigurable subscriber identification module (SIM) configured to store at least the first mobile identity as a primary mobile identity, the mobile device being operable so as to provide mobile data communication via a mobile network subject to the primary mobile identity being authorised with the mobile network,
   wherein the circuitry is further configured to
      obtain from the mobile identity database a second mobile identity to be used as the primary mobile identity after a predetermined period of use of the first mobile identity as the primary mobile identity or after a predetermined quantity of data transferred using the first mobile identity as the primary mobile identity.

2. The mobile device according to claim 1, wherein the circuitry is configured to detect the user identity in response to one or more of:

user entry of user-specific data;
detection of a biometric parameter of the current user; and
detection of a radio frequency identification token within a threshold distance of the mobile device.

3. The mobile device according to claim 1, wherein the mobile identity database is configured to provide the first mobile identity in dependence upon a geographical location of the mobile device.

4. The mobile device according to claim 1, wherein the mobile identity database is configured to provide the first mobile identity in response to initiation, by the current user, of a data communication service using the mobile device.

5. The mobile device according to claim 1, wherein the mobile identity database is configured to select the first mobile identity, from a group of two or more mobile identities, in dependence upon the cost, to the current user, of mobile data access using each of the possible mobile identities.

6. The mobile device according to claim 1, wherein the mobile identity database is a remote mobile identity database.

7. The mobile device according to claim 6, wherein the reconfigurable subscriber identification module is configured to store the first mobile identity as the primary mobile identity for providing mobile data communication and a further mobile identity, the reconfigurable subscriber identification module being arranged to use the further mobile identity at least for communication with the remote mobile identity database in respect of changes to the primary mobile identity.

8. The mobile device according to claim 1, wherein the mobile device or the mobile identity database is configured to maintain a list of user identities which are allowed to use the mobile device.

9. The mobile device according to claim 1, wherein the primary mobile identity comprises an International Mobile Subscriber Identifier number and an associated secret encryption key.

10. The mobile device according to claim 1, wherein the mobile device comprises the mobile identity database.

11. A method of operation of a mobile device, the method comprising:
    detecting a user identity of a current user of the mobile device based on a user input;
    accessing a mobile identity database, which is configured to store mobile identities and associated user identities, to obtain a first mobile identity associated with the detected user identity by searching the mobile identity database for the detected user identity;
    storing, in a reconfigurable subscriber identification module (SIM), at least the first mobile identity as a primary mobile identity for use by the mobile device for providing mobile data communication via a mobile network subject to the primary mobile identity being authorised with the mobile network; and
    obtaining from the mobile identity database a second mobile identity to be used as the primary mobile identity after a predetermined period of use of the first mobile identity as the primary mobile identity or after a predetermined quantity of data transferred using the first mobile identity as the primary mobile identity.

12. A non-transitory machine-readable storage medium on which is stored computer software which, when executed by a mobile device, causes the mobile device to perform a method, the method comprising:
    detecting a user identity of a current user of the mobile device based on a user input,
    accessing a mobile identity database, which is configured to store mobile identities and associated user identities, to obtain a first mobile identity associated with the detected user identity by searching the mobile identity database for the detected user identity;
    storing, in a reconfigurable subscriber identification module (SIM), at least the first mobile identity as a primary mobile identity for use by the mobile device for providing mobile data communication via a mobile network subject to the primary mobile identity being authorised with the mobile network; and
    obtaining from the mobile identity database a second mobile identity to be used as the primary mobile identity after a predetermined period of use of the first mobile identity as the primary mobile identity or after a predetermined quantity of data transferred using the first mobile identity as the primary mobile identity.

* * * * *

UNITED STATES PATENT AND TRADEMARK OFFICE
CERTIFICATE OF CORRECTION

PATENT NO.         : 9,591,476 B2                                           Page 1 of 1
APPLICATION NO.    : 14/378820
DATED              : March 7, 2017
INVENTOR(S)        : Stefan Lodeweyckx It is certified that error appears in the above-identified patent and that said Letters Patent is hereby corrected as shown below:

On the Title Page

Item (54) and in the Specification, Column 1, the Title should read:
--MOBILE COMMUNICATION USING RECONFIGURABLE USER IDENTIFICATION MODULE--

Signed and Sealed this
Seventeenth Day of April, 2018

Andrei Iancu
*Director of the United States Patent and Trademark Office*